United States Patent
Aoyagi et al.

(10) Patent No.: US 8,523,683 B2
(45) Date of Patent: Sep. 3, 2013

(54) STORAGE MEDIUM STORING GAME PROGRAM, GAME APPARATUS AND GAME CONTROL METHOD

(75) Inventors: Norihiro Aoyagi, Kyoto (JP); Yoshiaki Koizumi, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1824 days.

(21) Appl. No.: 11/640,410

(22) Filed: Dec. 18, 2006

(65) Prior Publication Data

US 2007/0265086 A1    Nov. 15, 2007

(30) Foreign Application Priority Data

May 9, 2006   (JP) ................. 2006-129874

(51) Int. Cl.
- *A63F 9/24* (2006.01)
- *A63F 13/00* (2006.01)
- *G06F 17/00* (2006.01)
- *G06F 19/00* (2011.01)

(52) U.S. Cl.
USPC .......... 463/43; 463/30; 463/31; 463/32; 463/33; 463/37; 463/51; 345/427

(58) Field of Classification Search
USPC .......... 463/30–33, 37, 43, 51; 345/427
See application file for complete search history.

(56) References Cited

U.S. PATENT DOCUMENTS

| | | | | |
|---|---|---|---|---|
| 5,835,078 A | * | 11/1998 | Arita et al. | 345/158 |
| 5,926,168 A | * | 7/1999 | Fan | 345/158 |
| 5,999,171 A | * | 12/1999 | Goff et al. | 345/180 |
| 2004/0176163 A1 | | 9/2004 | Ishihata et al. | |
| 2005/0107160 A1 | * | 5/2005 | Cheng et al. | 463/37 |
| 2005/0272506 A1 | * | 12/2005 | Sumi | 463/51 |
| 2007/0257914 A1 | * | 11/2007 | Komatsumoto | 345/427 |

FOREIGN PATENT DOCUMENTS

| | | |
|---|---|---|
| JP | 8-71252 | 3/1996 |
| JP | 10-333834 | 12/1998 |
| JP | 2004-174017 | 6/2004 |

OTHER PUBLICATIONS

Ubi Soft (Software and documnetation), Conflict Zone Manual, 2000, p. 23.*
Japanese Office Action issued for corresponding Japanese Patent Application No. 2006-129874, dated Jan. 10, 2012.

* cited by examiner

*Primary Examiner* — Omkar Deodhar
*Assistant Examiner* — Adetokunbo O Torimiro
(74) *Attorney, Agent, or Firm* — Nixon & Vanderhye P.C.

(57) ABSTRACT

A video game apparatus includes a CPU, the CPU detects marker coordinates data included in input data transmitted from a controller, and calculates indicated coordinates of the controller. A star object indicated by the controller is set as a target object by a player pressing a B-trigger switch. Then, a player object executes a processing according to the target object. For example, when the player continues to press the B-trigger switch, the player object is moved to approach the target object.

25 Claims, 16 Drawing Sheets

(A) UPPER FACE SIDE

COORDINATES SYSTEM OF CONTROLLER (B) LOWER FACE SIDE

COORDINATES SYSTEM OF CONTROLLER

STORAGE MEDIUM STORING GAME PROGRAM, GAME APPARATUS AND GAME CONTROL METHOD

CROSS REFERENCE OF RELATED APPLICATION

The disclosure of Japanese Patent Application No. 2006-129874 is incorporated herein by reference.

BACKGROUND

1. Field

Example embodiment of the present invention relate to a storage medium storing a game program, a game apparatus and a game control method. More specifically, example embodiments of the present invention relate to a storage medium storing a game program, a game apparatus, and a game control method for receiving input data from an input device and displaying a situation in a virtual game space after arithmetically processing by using the input data on a screen of the corresponding display.

2. Description of the Related Art

Conventionally, a game system using an optical pointing device is proposed. An example of the related art of this kind is disclosed in Japanese Patent Laying-open No. 08-71252 [A63F 9/22] laid-open on Mar. 19, 1996(technical document). This technical document discloses a shooting game apparatus using a gun type controller. This gun type controller is equipped with a CCD camera, and photographs by the CCD camera a light emitting body disposed as an object to be imaged around a video screen. Thus, the game apparatus is capable of detecting a distance between the screen and the gun type controller, rotation of the gun type controller, and a relative position of the gun type controller with respect to the screen. In addition, the coordinate (arrival point) on the screen indicated by the gun type controller is also calculated.

However, the gun type controller described in the technical document is used only for indicating a position on the display screen. Namely, the gun type controller is capable of only simple operation that the position on the display screen is indicated, and is not capable of performing other operation. Accordingly, the gun type controller only allows a simple game to be performed, such as to determine hitting/missing a target on the display screen. Therefore, there is lack of amusement, because not only a game operation but also the game itself shows a simple content.

SUMMARY

Therefore, it is an aspect of example embodiments of the present invention to provide a novel storage medium storing a game program, game apparatus and game control method.

It is another aspect of example embodiments of the present invention to provide a storage medium storing a game program, a game apparatus and a game control method capable of increasing an amusement of the game using a pointing device.

Example embodiments of the present invention adopt the following construction in order to solve the above-described problems. It should be noted that reference numerals and footnote, etc. which are enclosed in parentheses show only one example of correspondences with the embodiment described later in order to help the understandings of example embodiments of the present invention, and do not limit the present invention.

The storage medium storing the game program according to example embodiments of the present invention stores the game program executed by the game apparatus whereby input data is received from the pointing device including at least one input means, and the situation of a virtual game space after arithmetic processing by using the input data is displayed on the screen of the display. The game program causes the processor of the game apparatus to function as an object disposing means, a pointing position detecting means, a first object indication determining means, an operation state determining means and a second object controlling means. The object disposing means disposes the first object and the second object within the virtual game space. The pointing position detecting means detects a position on the screen indicated by the pointing device. The first object indication determining means determines whether or not the first object is indicated, based on a pointing position detected by the pointing position detecting means. The operation state determining means determines whether or not a predetermined input means is pressed in a state that the first object indication determining means determines that the first object is indicated. The second object controlling means controls the second object to execute the processing related to the first object when the operation state determining means determines that a predetermined input means is pressed.

Specifically, a game apparatus (12) receives the input data from a pointing device (22) including at least one input means (26), and displays on the screen the situation in the virtual game space after arithmetic processing by using the input data. The game program causes a processor (36) of the game apparatus to function as an object disposing means (36, S3), a pointing position detecting means (36, S9, S51), a first object indication determining means (36, S55), an operation state determining means (36 and S9, S71) and a second object controlling means (36, S89). The object disposing means disposes the first object (104) and the second object (102) in the virtual game space. For example, each object is generated and disposed in a three-dimensional virtual space. The pointing position detecting means detects the position on a screen (100) indicated by the pointing device. Namely, indicated coordinates of the pointing device are detected. The first object indication determining means determines whether or not the first object is indicated based on a pointing position (indicated coordinates) detected by the pointing position detecting means. For example, the first object indication determining means determines whether or not the indicated coordinates are brought into contact with or included in a display region of the first object. The operation state determining means determines whether or not a predetermined input means (26i) is pressed in a state that the first object indication determining means indicates the first object. When the operation state determining means determines that the predetermined input means is pressed, the second object controlling means controls the second object to perform the processing related to the first object. Namely, the processing in accordance with the first object is executed by the second object.

According to example embodiments of the present invention, since processing related to the indicated first object is performed by the second object, the amusement of the game using the pointing device can be increased.

According to one example embodiment of the present invention, the pointing device includes an imaging means for photographing an object to be imaged set in a circumference of the display, and the pointing position detecting means detects the position on the screen indicated by the pointing device based on a photographic result of the imaging means.

Specifically, the pointing device includes an imaging means (80) for photographing objects (32m, 32n) to be imaged set in the circumference of the display. The pointing position detecting means detects the position on the screen indicated by the pointing device based on a photographic result of the imaging means. For example, an intermediate position between two objects to be imaged is detected as the position directed by the pointing device, namely, the pointing position. Thus, since the position on the screen indicated by the pointing device is detected, the position can be easily detected.

According to another example embodiment of the present invention, the operation state determining means determines whether or not an operation is set in a state that the predetermined input means is continuously pressed, and the second object controlling means causes the second object to perform the processing related to the first object, while the operation state determining means determines the state to be set in the state that the predetermined input means is continuously pressed. Specifically, the operation state determining means determines whether or not the state is kept in the state that the predetermined input means is continuously pressed, namely, whether or not a pressing of the input means is continuing. The second object controlling means controls the second object to perform the processing related to the first object, while the operation state determining means determines that the state is kept in the state that the predetermined input means is continuously pressed. Thus, the second object is controlled to perform the processing related to the first object, only while the predetermined input means is continuously pressed. Namely, a player is allowed to select the time to control the second object to perform the processing related to the first object.

According to one aspect of example embodiments of the present invention, the game program further causes the processor to function as a distance determining means for determining a distance between the first object and the second object in the virtual space, when it is so determined that the first object is indicated by the first object indication determining means, and the second object controlling means controls the second object to perform the processing related to the first object, when the distance is within a predetermined range. Specifically, when it is so determined that the first object is indicated ("YES" in S55), distance determining means (36, S83) determines the distance between the first object and the second object in the virtual space. The second object controlling means controls the second object to perform the processing related to the first object, when the distance is within the predetermined range. Accordingly, when the distance exceeds the predetermined range, the second object controlling means does not allow the second object to perform the processing related to the first object. Accordingly, as long as the distance between the first object and the second object is within the predetermined range, the second object is allowed to perform the processing related to the first object.

According to another aspect of example embodiments of the present invention, the game program causes the processor to function as an existence determining means for determining whether or not other object exists between the first object and the second object when the first object indication determining means determines that the first object is indicated, and the second object controlling means controls the second object to perform the processing related to the first object when the existence determining means determines that other object does not exist. Specifically, existence determining means (36, S57) determines whether or not other object exists between the first object and the second object, when it is so determined that the first object is indicated ("YES" in S55). Namely, the existence determining means determines whether or not the player can allow the second object to perform the processing related to the first object. When other object does not exist, the second object controlling means controls the second object to perform the processing related to the first object. Namely, as long as other object does not exit between the first object and the second object, the second object is allowed to perform the processing related to the first object. According to another example embodiment of the present invention, the second object controlling means controls a movement of the second object so that the second object approaches the first object. Therefore, by controlling the second object to approach the first object and by changing the indicated first object, a player object can be moved in the virtual game space.

According to still another aspect of example embodiments of the present invention, the game program further causes the processor to function as a speed calculating means for calculating a moving speed of the second object based on the distance, and the second object controlling means controls a movement of the second object based on the speed calculated by the speed calculating means. Specifically, the speed calculating means (36, S15) calculates the moving speed of the second object based on the distance between the first object and the second object. The second object controlling means controls the movement of the second object based on the speed calculated by the speed calculating means. Accordingly, in accordance with the distance between the first object and the second object, the moving speed of the first object can be changed.

According to still another example embodiment of the present invention, the object disposing means disposes a plurality of first objects, and the first object indication determining means further determines which one of the plurality of first objects is indicated, and the second object controlling means controls the second object to perform different processing respectively for each first object determined to be indicated. Specifically, the object disposing means disposes a plurality of first objects. The first object indication determining means determines not only whether or not the first object is indicated, but also which one of the plurality of first objects is indicated. The second object controlling means controls the second object to perform the different processing respectively for each first object determined to be indicated. Namely, since the second object is allowed to perform the processing in accordance with the first object, the amusement of the game using the pointing device can be increased.

According to example embodiments of the present invention, the game apparatus receives the input data from the pointing device including at least one input means, and displays on the screen of the display the situation in the virtual game space after arithmetic processing by using the input data. The game apparatus comprises an object disposing means, a pointing position detecting means, a first object indication determining means, an operation state determining means, and a second object controlling means. The object disposing means disposes the first object and the second object in the virtual game space. The pointing position detecting means detects the position on the screen indicated by the pointing device. The first object indication determining means determines whether or not the first object is indicated, based on the pointing position detected by the pointing position detecting means. The operation state determining means determines whether or not the predetermined input means is pressed in a state that the first object is determined to be indicated by the first object indication determining means. The second object controlling means controls the second object to perform the processing related to the first object, when the operation state determining means determines that the predetermined input means is pressed.

According to the game apparatus of example embodiments of the present invention also, in the same way as the storage medium of example embodiments of the present invention, the amusement of the game using the pointing device can be increased.

According to the game control method of example embodiments of the present invention, the input data is received from the pointing device including at least one input means, and a situation in the virtual game space after arithmetic processing by using this input data is displayed on the screen of a relevant display, comprising the steps of: (a) disposing the first object and the second object in the virtual game space; (b) detecting the position on the screen indicated by the pointing device; (c) determining whether or not the first object is indicated based on the pointing position detected in the step (b); (d) determining whether or not a predetermined input means is pressed in a state that it is so determined in the step (c) that the first object is indicated; and (e) controlling the second object to perform the processing related to the first object when it is so determined in the step (d) that the predetermined input means is pressed.

According to the game control method of example embodiments the present invention also, in the same way as the storage medium of the example embodiments present invention, the amusement of the game by using the pointing device can be increased.

The above described features, aspects and advantages of example embodiments the present invention will become more apparent from the following detailed description of example embodiments the present invention when taken in conjunction with the accompanying drawings.

DETAILED DESCRIPTION OF THE EMBODIMENTS

Figure 1:
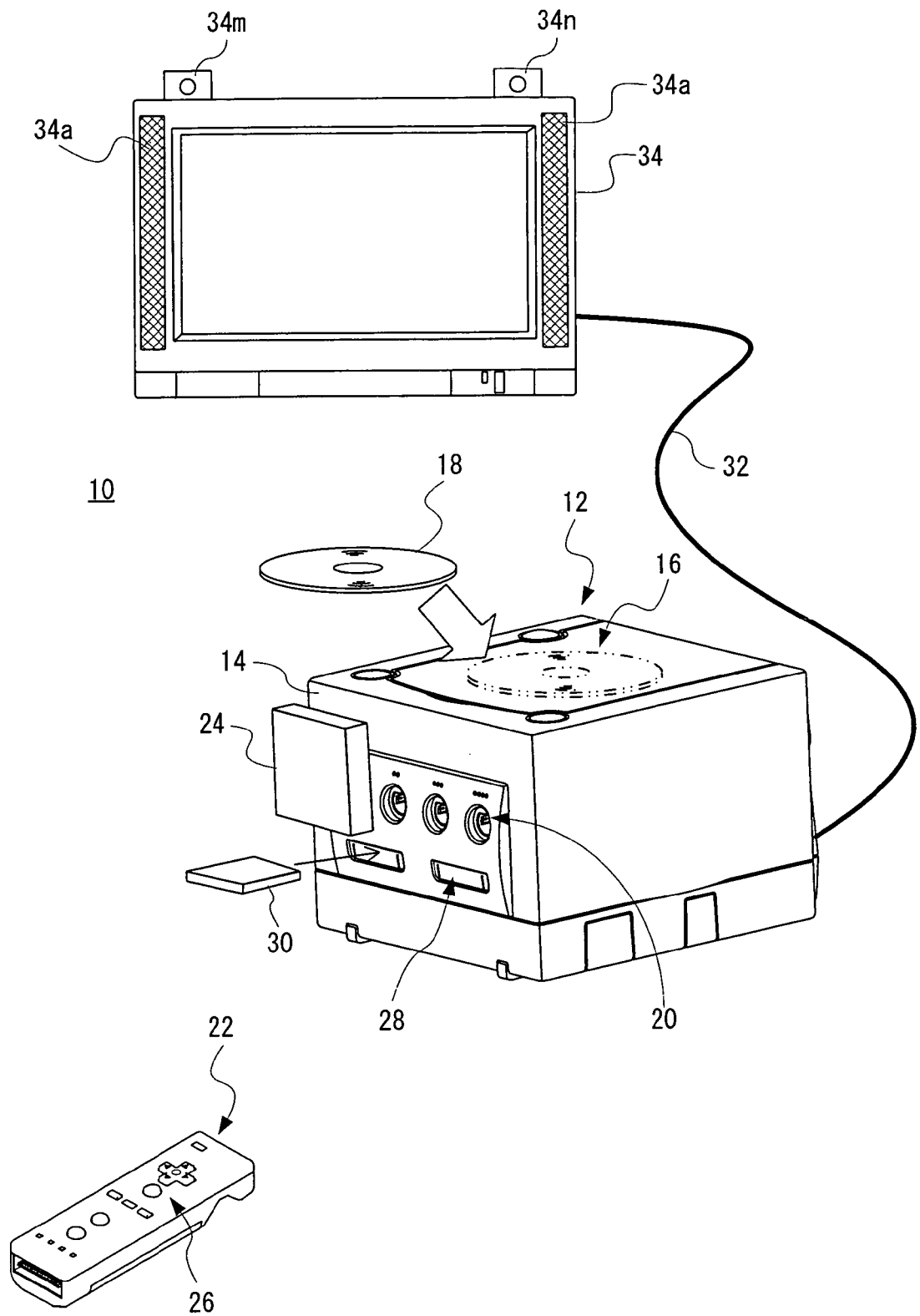
FIG. 1 is an illustrative view showing a game system of one example embodiment of the present invention.

Referring to FIG. 1, a game system 10 as one example embodiment of the present invention includes a video game apparatus 12. The video game apparatus 12 includes an approximately cubic housing 14, and an optical disc drive 16 is provided on an upper end of the housing 14. Attached to the optical disc drive 16 is an optical disc 18 as an example of information storage medium storing a game program, etc. Provided on a front surface of the housing 14 is a plurality of (four in this embodiment) connectors 20. Therese connectors 20 function to connect the controller 22 as a pointing device to the video game apparatus 12 by cable or radio through a cable (not shown) or a receiving unit 24. As shown in FIG. 1, in this embodiment, the receiving unit 24 is connected to the connector 20, and through the receiving unit 24, the controller 22 is connected to the video game 12 by radio. Details of the controller 22 will be explained later.

In this embodiment, according to this embodiment, radio communication is performed between the video game apparatus 12 and the controller 22, and therefore it is not originally preferable to use the term, "connection". However, as the term expressing a connected state capable of communicating between the video game apparatus 12 and the controller 22, the term for the cable communication is borrowed and the term "connection" is therefore used for convenience.

One or a plurality of (two in this embodiment) memory slots 28 are provided on the front surface of the housing 14 and below the connector 20. A memory card 30 is inserted into the memory slot 28. The memory card 30 is used to load and store temporarily a game program, etc. read out from the optical disc 18 and save data on a game played with the game system 10 (game result data or in-progress game data).

An AV cable connector (not shown) is provided on a rear surface of the housing 14 of the video game apparatus. The connector is used to connect a monitor 34 to the video game apparatus 12 through the AV cable 32. The monitor 34 is typically a color television receiver. The AV cable 32 inputs a video signal from the video game apparatus 12 to a video input terminal of a color TV and inputs a sound signal to a sound input terminal. Accordingly, a game image of a three-dimensional (3D) video game is displayed on a screen of the color TV (monitor) 34, and stereo game sounds such as game music and sound effects are output from speakers 34a on both sides. Moreover, two markers 34m and 34n are provided in the circumference of the monitor 34 (at an upper side in this embodiment). The markers 34m and 34n are infrared LED and outputs infrared light toward the front of the monitor 34, respectively.

In the game system 10, for a user or a game player to play a game (or another application), the user firstly turns on the video game apparatus 12, next selects an appropriate optical disc 18 in which the video game (or another application to be played) is stored, and then loads the optical disk 18 into the disk drive 16 of the video game apparatus 12. Accordingly, the video game apparatus 12 starts executing the video game or another application based on software stored in the optical disk 18. The user operates the controller 22 to provide input to the video game apparatus 12. For example, the game or another application is started by manipulating some section of the operating part 26. By manipulating another section of the operating part 26, it is possible to move a moving image object (player object) in a different direction or change the viewpoint of the user (camera position) in a game world.

Figure 2:
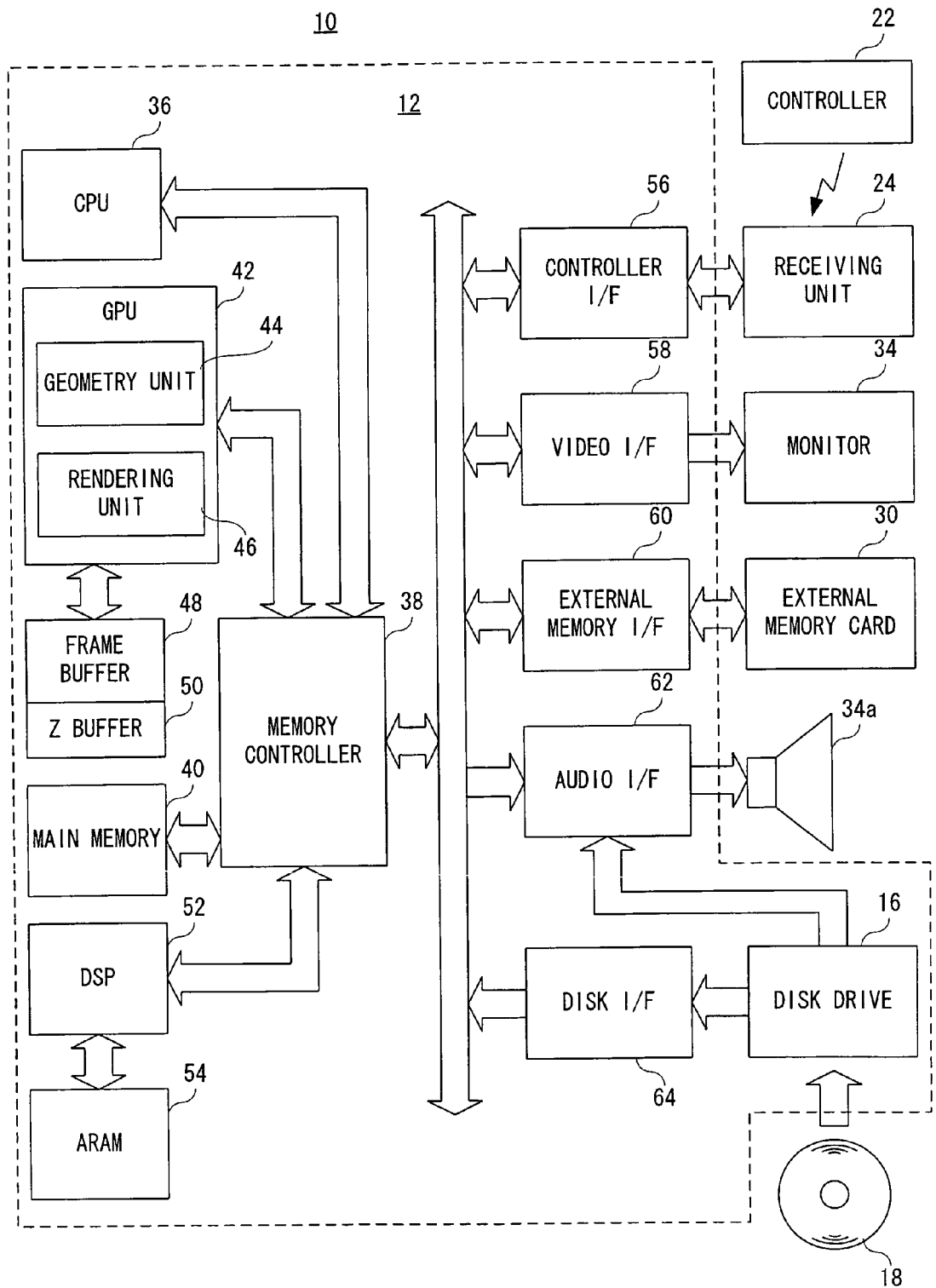
FIG. 2 is a block diagram showing an electrical constitution of the game system as shown in FIG. 1.

FIG. 2 is a block diagram showing an electrical structure of the video game system 10 of FIG. 1 embodiment. The video game apparatus 12 is provided with a central processing unit (hereinafter referred to as "CPU") 36. The CPU 36 is also called computer or processor, and responsible for entirely controlling the video game apparatus 12. The CPU 36 or computer functions as a game processor and is connected with a memory controller 38 via a bus. The memory controller 38 mainly controls writing to and reading from a main memory 40 connected via the bus, under control of the CPU 36. The memory controller 38 is connected with a GPU (Graphics Processing Unit) 42.

The GPU 42 constitutes a part of a rendering means and consists of a single-chip ASIC, for example. It receives a graphics command (rendering order) from the CPU 36 via the memory controller 38, and generates a three-dimensional (3D) game image according to the command by using a geometry unit 44 and a rendering unit 46. More specifically, the geometry unit 44 carries out coordinate operation processes such as rotation, movement and transformation of various objects and objects in a three-dimensional coordinate system (consisting of a plurality of polygons. The polygon denotes a multangular plane defined by at least three vertex coordinates.) The rendering unit 46 subjects each polygon of various objects to image generating processes such as pasting a texture (pattern image). Accordingly, 3D image data to be displayed on the game screen is generated by the GPU 42 and stored in a frame buffer 48.

Incidentally, the GPU 42 obtains data (primitives or polygons, textures etc.) required for the GPU 42 to execute the rendering command, from the main memory 40 via the memory controller 38.

The frame buffer 48 is a memory for rendering (accumulating) one frame of image data in a raster scan monitor 34, for example, and is updated by the GPU 42 on a frame-by-frame basis. More specifically, the frame buffer 48 stores color information of an image in orderly sequence on a pixel-by-pixel basis. The color information here is data of R, G, B and A, and for example, 8-bit R (red) data, 8-bit G (green) data, 8-bit B (blue) data and 8-bit A (alpha) data. Also, the A data is data on mask (mat image). A video I/F 58 described later reads out the data from the frame buffer 48 via the memory controller 38, thereby displaying a 3D game image on the screen of the monitor 34.

In addition, a Z buffer 50 has a capacity equivalent to the number of pixels corresponding to the frame buffer 48× the number of bits of depth data per pixel, and stores depth information or depth data (Z value) of a dot corresponding to each storage position in the frame buffer 48.

Besides, both the frame buffer 48 and the Z buffer 50 may be formed with use of one part of the main memory 40, and also may be provided within the GPU 42.

The memory controller 38 is also connected to an ARAM 54 via a DSP (Digital Signal Processor) 52. Thus, the memory controller 38 controls not only the main memory 40 but also writing to and/or reading from the ARAM 54 as a sub-memory.

The DSP 52 functions as a sound processor and generates audio data corresponding to sounds, voice or music required for the game by using sound data (not illustrated) stored in the main memory 40 or audio waveform data (not illustrated) written into the ARAM 54.

The memory controller 38 is further connected via the bus to interfaces (I/F) 56, 58, 60, 62 and 64. The controller I/F 56 is an interface for the controller 22 connected to the video game apparatus 12 via the receiving unit 24. More specifically, the receiving unit 24 receives input data sent from the controller 22, and the controller I/F 56 applies the input data to the CPU 36 through the memory controller 38. It should be noted that in this embodiment, the input data includes at least any one of operation data, acceleration data, and marker coordinate data described later. The video I/F 58 accesses the frame buffer 48 to read out the image data generated by the GPU 42 and provides an image signal or image data (digital RGBA pixel values) to the monitor 34 via the AV cable 32 (FIG. 1).

The external memory I/F 60 links a memory card 30 (FIG. 1) inserted into the front surface of the video game apparatus 12, with the memory controller 38. This allows the CPU 36 to write data into the memory card 30 or read out data from the memory card 30 via the memory controller 38. The audio I/F 62 receives audio data provided by the DSP 52 via the memory controller 38 or an audio stream read out from the optical disk 18, and provides the speaker 34a of the monitor 34 with an audio signal (sound signal) corresponding to it.

Furthermore, the disk I/F 64 connects the disk drive 16 to the memory controller 38, which causes the CPU 36 to control the disk drive 16. Program data, texture data and the like read out by the disk drive 16 from the optical disk 18 are written into the main memory 40 under control of the CPU 36.

Figure 3:
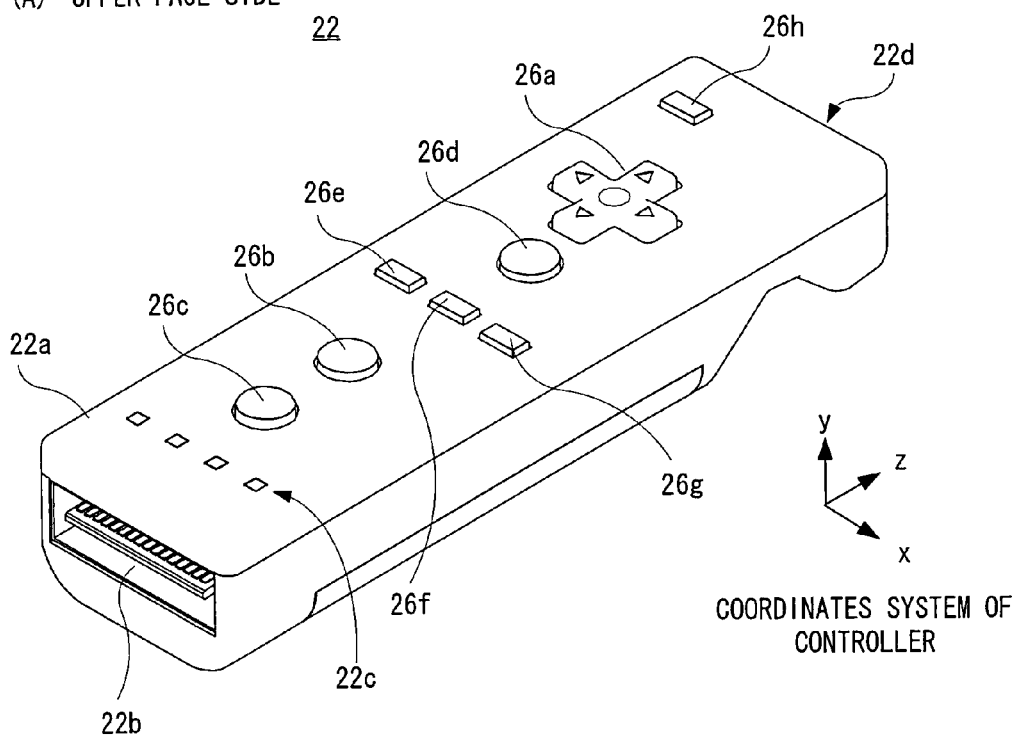
FIG. 3 is an perspective view showing a controller as shown in FIG. 1 viewed from an upper face rearward and lower face rearward.
Figure 3:
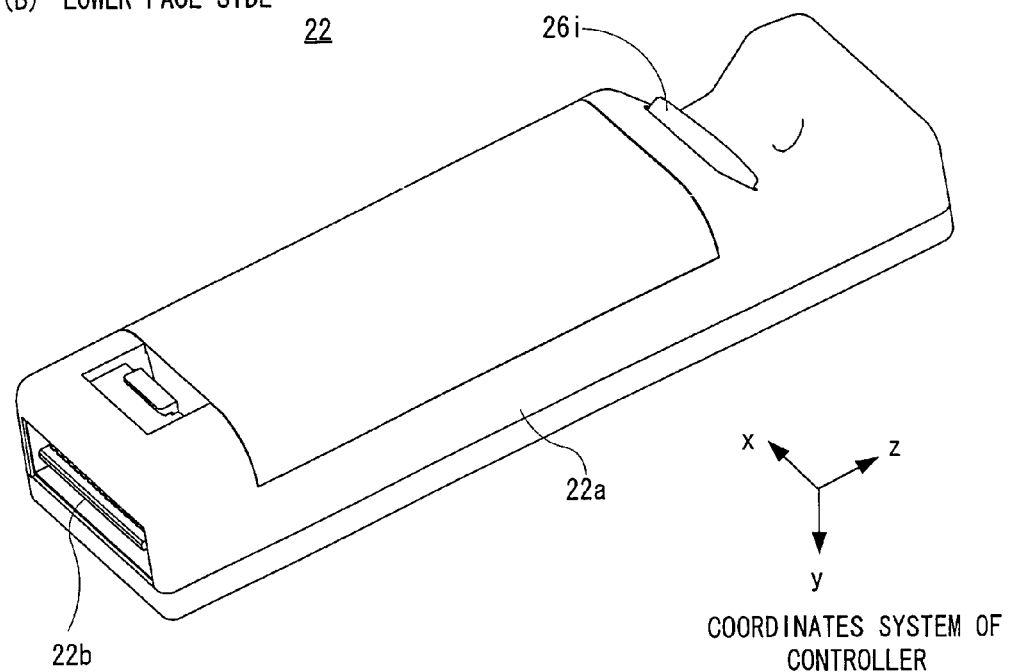
Figure 4:
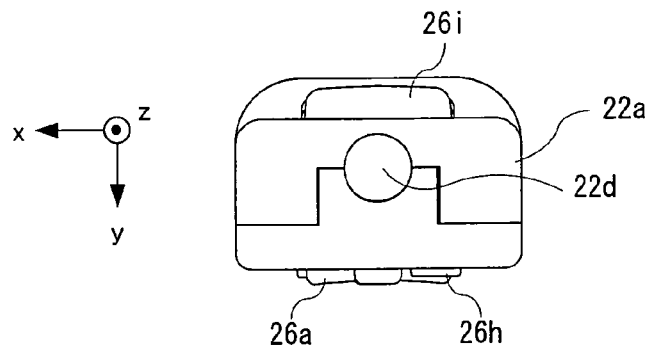
FIG. 4 is a front view showing the controller as shown in FIG. 1 viewed from the front.

FIG. 3 and FIG. 4 show an example of an outer appearance of the controller 22. FIG. 3 (A) is a perspective view of the controller 22 viewed from the rear side of the upper face thereof, and FIG. 3 (B) is a perspective view of the controller 22 viewed from the rear side of the lower face thereof. FIG. 4 is a front view of the controller 22 viewed from the front thereof.

Referring to FIG. 3 and FIG. 4, the controller 22 has a housing 22a formed by plastic molding, for example. The housing 22a is formed into an approximately rectangular parallelepiped shape, having a size small enough to be held by one hand of a user. As described above, the input means (a plurality of buttons or switches) 26 are provided in the housing 22a (controller 22). Specifically, as shown in FIG. 3(A), on an upper face of the housing 22a (controller 22), there are provided a cross key 26a, an X-button 26b, a Y-button 26c, an A-button 26d, a select switch 26e, a menu (home) switch 26f, a start switch 26g, and a power supply switch 26h. Meanwhile, as shown in FIG. 3(B), a lower surface of the housing 22a has a concave portion, and a B-trigger switch 26i is provided on a rear-side inclined surface of the concave portion.

The cross key 26a is a four directional push switch, including four directions of front (or upper), back (or lower), right and left operation parts. By operating any one of the operation parts, it is possible to instruct a moving direction of a character or object (player character or player object) that is be operable by a player or instruct the moving direction of a cursor.

The X-button 26b and the Y-button 26c are respectively push button switches, and are used for adjusting a viewpoint position and a viewpoint direction on displaying the 3D game image, i.e. a position and an image angle of a virtual camera. Alternatively, the X-button 26*b* and the Y-button 26*c* can be used for the same operation as that of the A-button 26*d* and the B-trigger switch 26*i* or an auxiliary operation.

The A-button switch 26*d* is the push button switch, and is used for causing the player character or the player object to take an action other than that instructed by a directional instruction, specifically arbitrary actions such as hitting (punching), throwing, grasping (acquiring), riding, and jumping, etc. For example, in an action game, it is possible to give an instruction to jump, punch, move a weapon, and so forth. Also, in a roll playing game (RPG) and a simulation RPG, it is possible to instruct to acquire an item, select and determine the weapon and command and so forth.

The select switch 26*e*, the menu switch 26*f*, the start switch 26*g*, and the power supply switch 26*h* are also push button switches. The select switch 26*e* is used for selecting a game mode. The menu switch 26*f* is used for displaying a game menu (menu screen). The start switch 26*g* is used for starting (re-starting) or temporarily posing the game. The power supply switch 26*h* is used for turning on/off a power supply of the video game apparatus 12 by remote control.

In this embodiment, not that the power switch for turning on/off the controller 22 itself is not provided, and the controller 22 is set at on-state by operating any one of the switches or buttons of the input means 26 of the controller 22, and when not operated for a certain period of time (30 seconds, for example) or more, the controller 22 is automatically set at off-state.

The B-trigger switch 26*i* is also the push button switch, and is mainly used for inputting a trigger such as shooting and designating a position selected by the controller 22. In a case that the B-trigger switch 26*i* is continued to be pressed, it is possible to make movements and parameters of the player object constant. In a fixed case, the B-trigger switch 26*i* functions in the same way as a normal B-button, and is used for canceling the action determined by the A-button 26*d*.

In addition, an external expansion connector 22*b* is provided on a back end surface of the housing 22*a*, and an indicator 22*c* is provided on the top surface and the back end surface of the housing 22*a* of the housing 22*a*. The external expansion connector 22*b* is utilized for connecting another controller not shown. The indicator 22*c* is made up of four LEDs, for example, and shows identification information (controller number) of the controller 22 by lighting any one of the four LEDs.

In addition, the controller 22 has an imaged information arithmetic section 80 (see FIG. 5), and as shown in FIG. 4, on the front end surface of the housing 22*a*, light incident opening 22*d* of the imaged information arithmetic section 80 is provided.

Note that as shown in FIG. 3, the shape of the controller 22 and the shape, number and setting position of each input means 26 are simply examples, and needless to say, even if they are suitably modified, example embodiments of the present invention can be realized.

Figure 5:
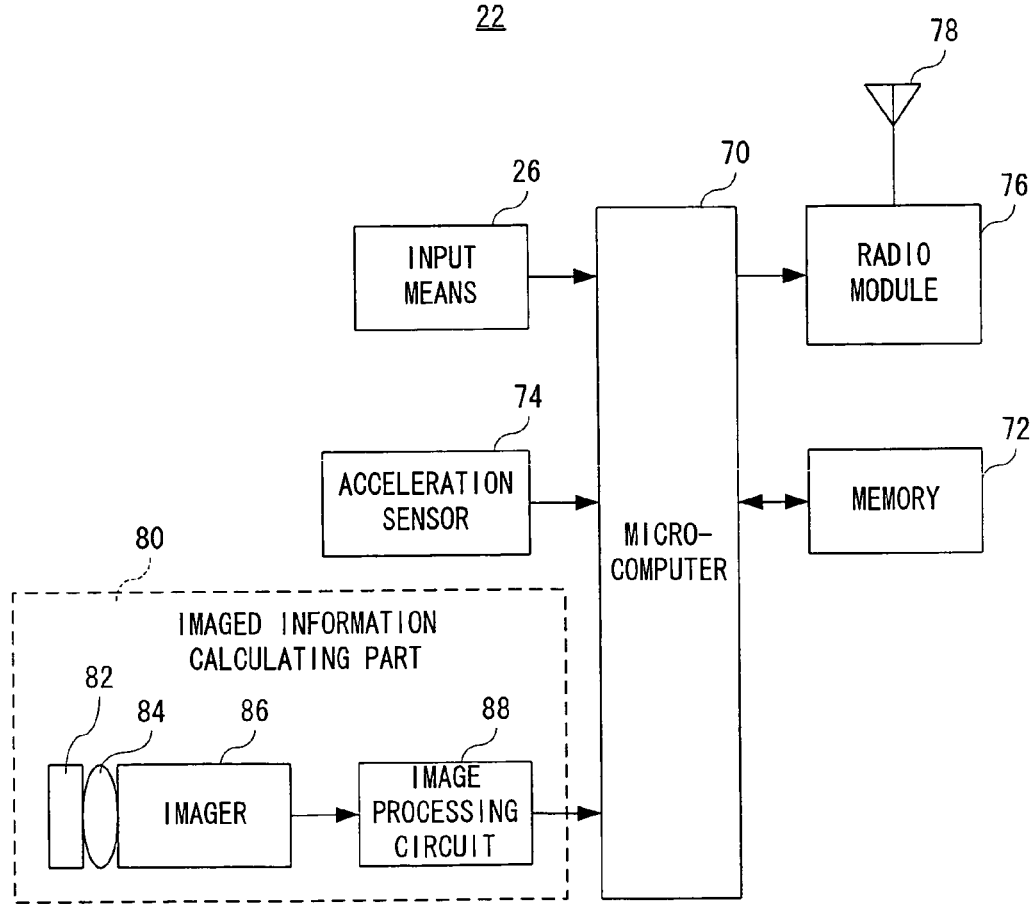
FIG. 5 is a block diagram showing an electrical constitution of the controller as shown in FIG. 3.

FIG. 5 is a block diagram showing the electric configuration of the controller 22. Referring to FIG. 5, the controller 22 includes a microcomputer 70, and the microcomputer 70 is connected with an input means 26, a memory 72, an acceleration sensor 74, and a radio module 76 by an internal bus (not shown). Moreover, an antenna 78 is connected to the radio module 76.

Although illustration is omitted, as described above the external expansion connector 22*b* and indicator 22*c* (LED) are also connected with the microcomputer 70 via an interface or a driver.

The microcomputer 70 is in charge of an overall control of the controller 22, and transmits (inputs) information (input information) inputted by the input means 26 and the acceleration sensor 74 as input data, to the video game apparatus 12 via the radio module 76 and the antenna 78. At this time, the microcomputer 70 uses the memory 72 as a working area or a buffer area.

An operation signal (operation data) from the aforementioned input means 26 (26*a* to 26*i*) is inputted to the microcomputer 70, and the microcomputer 70 stores the operation data once in the memory 72.

Moreover, the acceleration sensor 74 detects each acceleration in directions of three axes of vertical direction (y-axial direction shown in FIG. 3), lateral direction (x-axial direction shown in FIG. 3), and forward and rearward directions (z-axial direction shown in FIG. 3). The acceleration sensor 74 is typically an acceleration sensor of an electrostatic capacity type, but the acceleration sensor of other type may also be used.

For example, the acceleration sensor 74 detects the accelerations (ax, ay, az) in each direction of x-axis, y-axis, z-axis for each first predetermined time (such as 200 msec), and inputs the data of the acceleration (acceleration data) thus detected in the microcomputer 70. For example, the acceleration sensor 74 detects the acceleration in each direction of the axes in a range from −2.0 g to 2.0 g (g indicates a gravitational acceleration. The same thing can be said hereafter.). The microcomputer 70 detects the acceleration data given from the acceleration sensor 74 for each second predetermined time (for example, 1 frame: each screen update unit time (1/60 sec)), and stores it in the memory 72 once. The microcomputer 70 generates input data including at least one of the operation data, acceleration data and the marker coordinate data, and transmits the input data thus generated to the video game apparatus 12 for each third predetermined time (1 frame).

In this embodiment, although omitted in FIG. 3, the acceleration sensor 74 is provided inside the housing 22*a* and in the vicinity of a place where the cross key 26*a* is arranged.

The radio module 76 modulates a carrier of a predetermined frequency by the input information data, by using a technique of Bluetooth, for example, and emits its weak radio wave signal from the antenna 78. Namely, the input data is modulated to the weak radio wave signal by the radio module 76 and transmitted from the antenna 78 (controller 22). The weak radio wave signal thus transmitted is received by a Bluetooth communication unit 66 loaded on the aforementioned video game apparatus 12. The weak radio wave thus received is subjected to demodulating and decoding processing, thus making it possible for the video game apparatus 12 (CPU 36) to acquire the input data from the controller 22. Then, the CPU 36 performs game processing, following the input data and the program (game program).

In addition, as described above, the controller 22 is provided with the imaged information arithmetic section 80. The imaged information arithmetic section 80 is made up of an infrared rays filter 82, a lens 84, an imager 86, and an image processing circuit 88. The infrared rays filter 82 passes only infrared rays from the light incident from the front of the controller 22. As described above, the markers 34*m* and 34*n* placed near (around) the display screen of the monitor 34 are infrared LEDs for outputting infrared lights forward the monitor 34. Accordingly, by providing the infrared rays filter 82, it is possible to image the image of the markers 34*m* and 34*n* more accurately. The lens 84 condenses the infrared rays passing thorough the infrared rays filter 82 to emit them to the imager 86. The imager 86 is a solid imager, such as a CMOS sensor and a CCD, for example, and images the infrared rays condensed by the lens 80*b*. Accordingly, the imager 86 images only the infrared rays passing through the infrared rays filter 82 to generate image data. Hereafter, the image imaged by the imager 86 is called an "imaged image". The image data generated by the imager 86 is processed by the image processing circuit 88. The image processing circuit 88 calculates a position of an object to be imaged (markers 34*m* and 34*n*) within the imaged image, and outputs each coordinate value indicative of the image to the microcomputer 70 as imaged data for each fourth predetermined time (one frame, for example). It should be noted that a description of the image processing circuit 88 is made later.

FIG. 5 is an illustrative view summarizing a state when a player plays a game by utilizing a controller 22. As shown in FIG. 5, when playing the game by means of the controller 22 in the video game system 10, the player holds the controller 22 with one hand. Strictly speaking, the player holds the controller 22 in a state that the front end surface (the side of the incident light opening 22*d* of the light imaged by the imaged information arithmetic section 80) of the controller 22 is oriented to the markers 34*m* and 34*n*. It should be noted that as can be understood from FIG. 1, the markers 34*m* and 34*n* are placed in parallel with the horizontal direction of the screen of the monitor 34. In this state, the player performs a game operation by changing a position on the screen indicated by the controller 22, and changing a distance between the controller 22 and each of the markers 34*m* and 34*n*.

Figure 6:
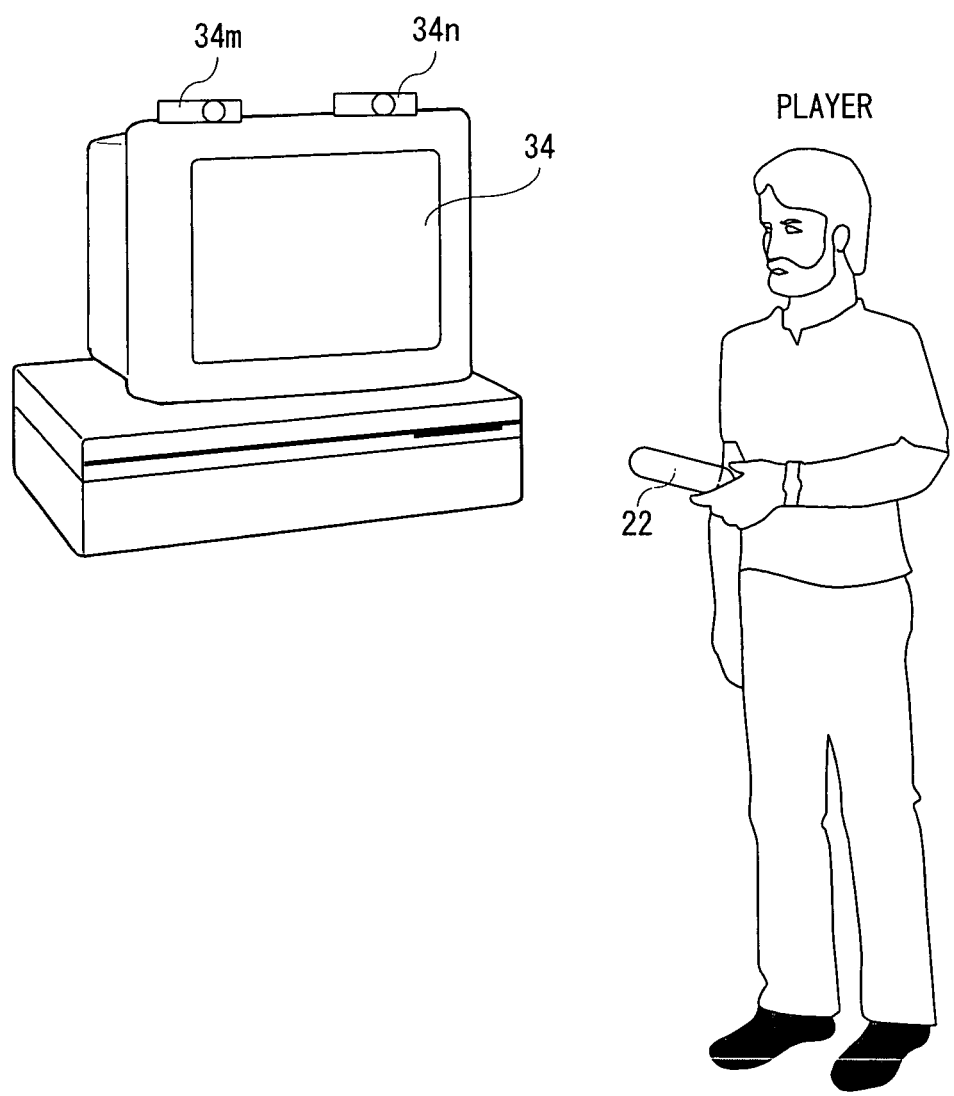
FIG. 6 is an illustrative view for schematically explaining a state of playing a game by using the controller as shown in FIG. 1.

FIG. 6 is a view showing viewing angles between the respective markers 34*m* and 34*n*, and the controller 22. As shown in FIG. 6, each of the markers 34*m* and 34*n* emits infrared ray within a range of a viewing angle θ1. Also, the imager 86 of the imaged information arithmetic section 80 can receive incident light within the range of the viewing angle θ2 taking the line of sight of the controller 22 as a center. For example, the viewing angle θ1 of each of the markers 34*m* and 34*n* is 34 degrees (half-value angle) while the viewing angle θ2 of the imager 86 is 41 degrees. The player holds the controller 22 such that the imager 86 is directed and positioned so as to receive the infrared rays from the markers 34*m* and 34*n*. More specifically, the player holds the controller 22 such that at least one of the markers 34*m* and 34*n* exists in the viewing angle θ2 of the imager 80*c*, and the controller 22 exists in at least one of the viewing angles θ1 of the marker 34*m* or 34*n*. In this state, the controller 22 can detect at least one of the markers 34*m* and 34*n*. The player can perform the game operation by changing the position and the orientation of the controller 22 in the range satisfying the state.

If the position and the orientation of the controller 22 are out of the range, the game operation based on the position and the orientation of the controller 22 cannot be performed. Hereafter, the above-described range is called an "operable range"

Figure 7:
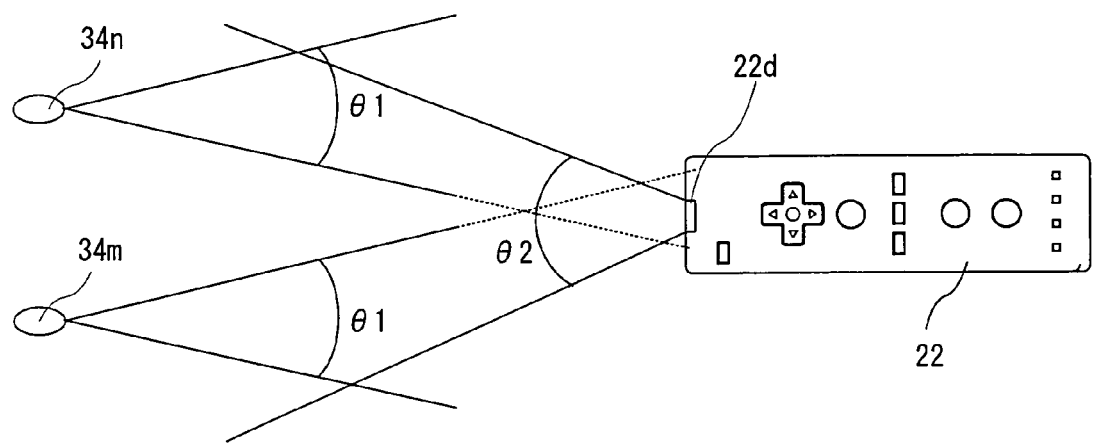
FIG. 7 is an illustrative view for explaining a visual angle of a marker and the controller as shown in FIG. 1.
Figure 8:
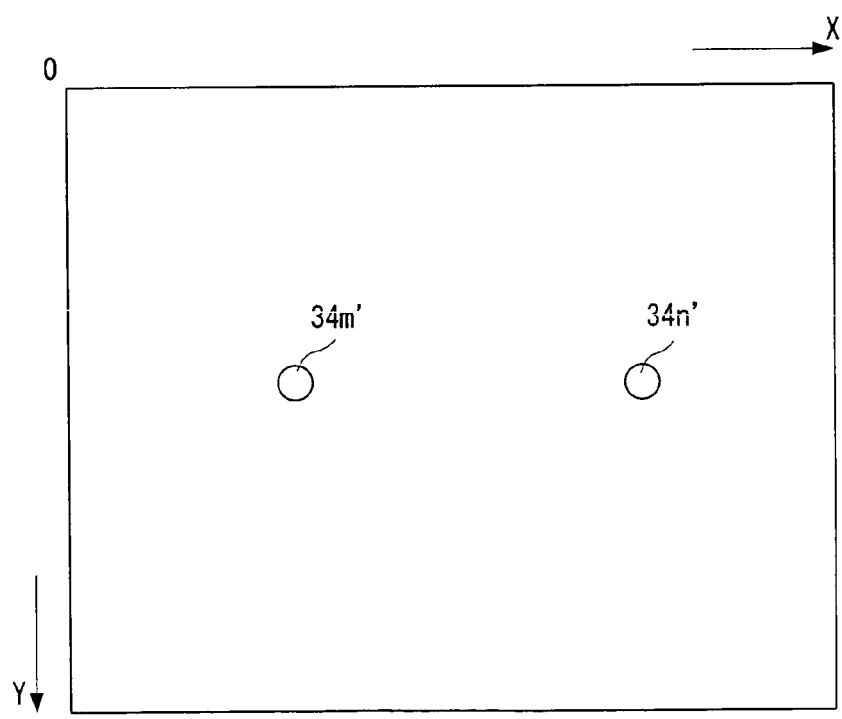
FIG. 8 is an illustrative view showing an example of a photographing image including an target object.

If the controller 22 is held within the operable range, an image of each of the markers 34*m* and 34*n* is imaged by the imaged information arithmetic section 80. That is, the imaged image obtained by the imager 86 includes an image (object image) of each of the markers 34*m* and 34*n* as an object to be imaged. FIG. 7 is a view showing one example of the imaged image including an object image. The image processing circuit 88 calculates coordinates (marker coordinates) indicative of the position of each of the markers 34*m* and 34*n* in the imaged image by utilizing the image data of the imaged image including the object image.

Since the object image appears as a high-intensity part in the image data of the imaged image, the image processing circuit 88 first detects the high-intensity part as a candidate of the object image. Next, the image processing circuit 88 determines whether or not the high-intensity part is an object image on the basis of the size of the detected high-intensity part. The imaged image may include images other than the object image due to sunlight through a window and light of a fluorescent lamp in the room as well as the images 34 m' and 34*n*' of the two markers 34*m* and 34*n* as an object image. The determination processing whether or not the high-intensity part is an object image is executed for discriminating the images 34 m' and 34*n*' of the two markers 34*m* and 34*n* as an object image from the images other than them, and accurately detecting the object image. More specifically, in the determination process, it is determined whether or not the detected high-intensity part is within the size of the preset predetermined range. Then, if the high-intensity part is within the size of the predetermined range, it is determined that the high-intensity part represents the object image. On the contrary, if the high-intensity part is not within the size of the predetermined range, it is determined that the high-intensity part represents the images other than the object image.

In addition, as to the high-intensity part which is determined to represent the object image as a result of the above-described determination processing, the image processing circuit 88 calculates the position of the high-intensity part. More specifically, the barycenter position of the high-intensity part is calculated. Here, the coordinates of the barycenter position is called a "marker coordinate". Also, the barycenter position can be calculated with more detailed scale than the resolution of the imager 86. Now, the resolution of the imaged image imaged by the imager 86 shall be 126×96, and the barycenter position shall be calculated with the scale of 1024×768. That is, the marker coordinate is represented by the integer from (0, 0) to (1024, 768).

Additionally, the position in the imaged image shall be represented by a coordinate system (XY coordinate system) taking the upper left of the imaged image as an origin point, the downward direction as an Y-axis positive direction, and the right direction as an X-axis positive direction.

Also, if the object image is properly detected, two high-intensity parts are determined as an object image by the determination process, and therefore, two marker coordinates are calculated. The image processing circuit 80*d* outputs data indicative of the calculated two marker coordinates. The data (marker coordinate data) of the output marker coordinates is included in the input data by the microcomputer 70 as described above, and transmitted to the video game apparatus 12.

The video game apparatus 12 (CPU 36) detects the marker coordinate data from the received input data to thereby calculate an instructed position (instructed coordinate) by the controller 22 on the screen of the monitor 34 and a distance from the controller 22 to each of the markers 34*m* and 34*n* on the basis of the marker coordinate data. More specifically, the position of the mid point of the two marker coordinates is adopted (calculated) as a position to which the controller 22 faces, that is, an instructed position. The distance between the object images in the imaged image is changed depending on the distance between the controller 22 and each of the markers 34*m* and 34*n*, and therefore, the video game apparatus 12 can grasp the distance between the controller 22 and each of the markers 34*m* and 34*n* by calculating the distance between the two marker coordinates.

Figure 9:
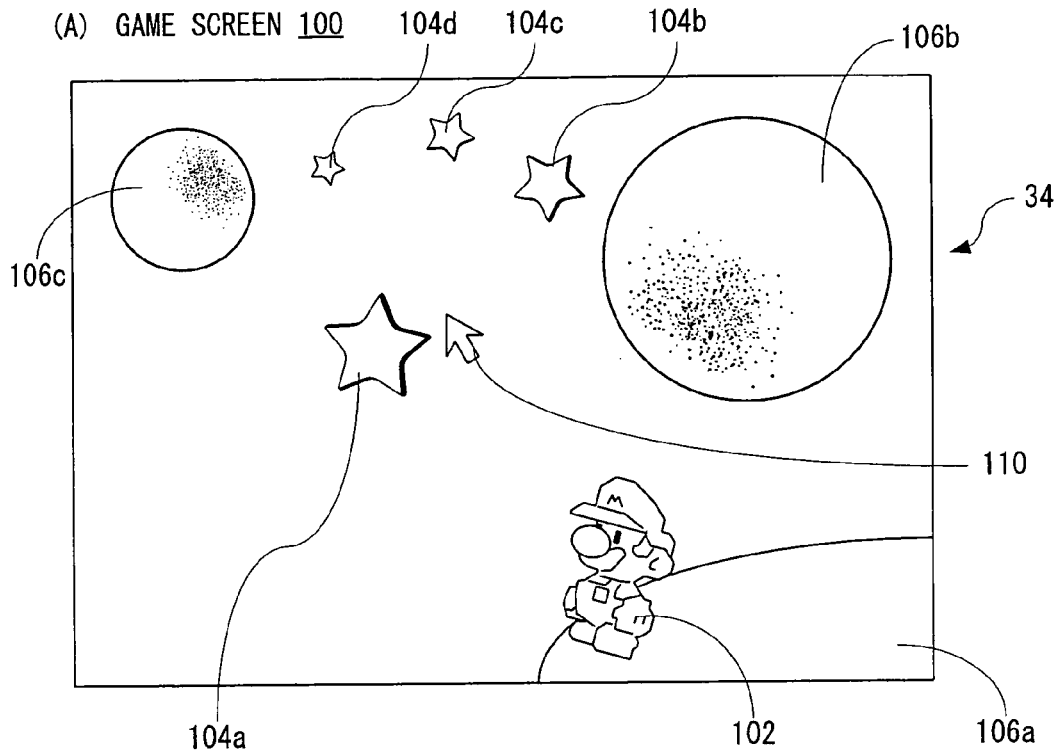
FIG. 9 is an illustrative view showing an example of a game screen displayed on a monitor as shown in FIG. 1.
Figure 9:
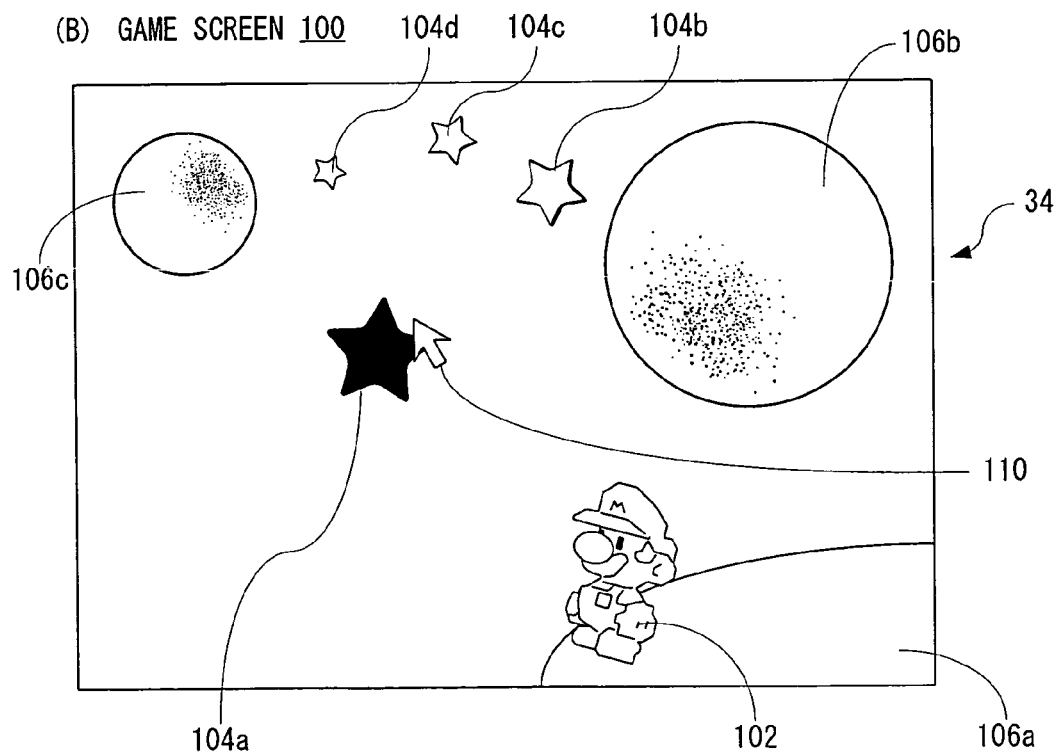
Figure 10:
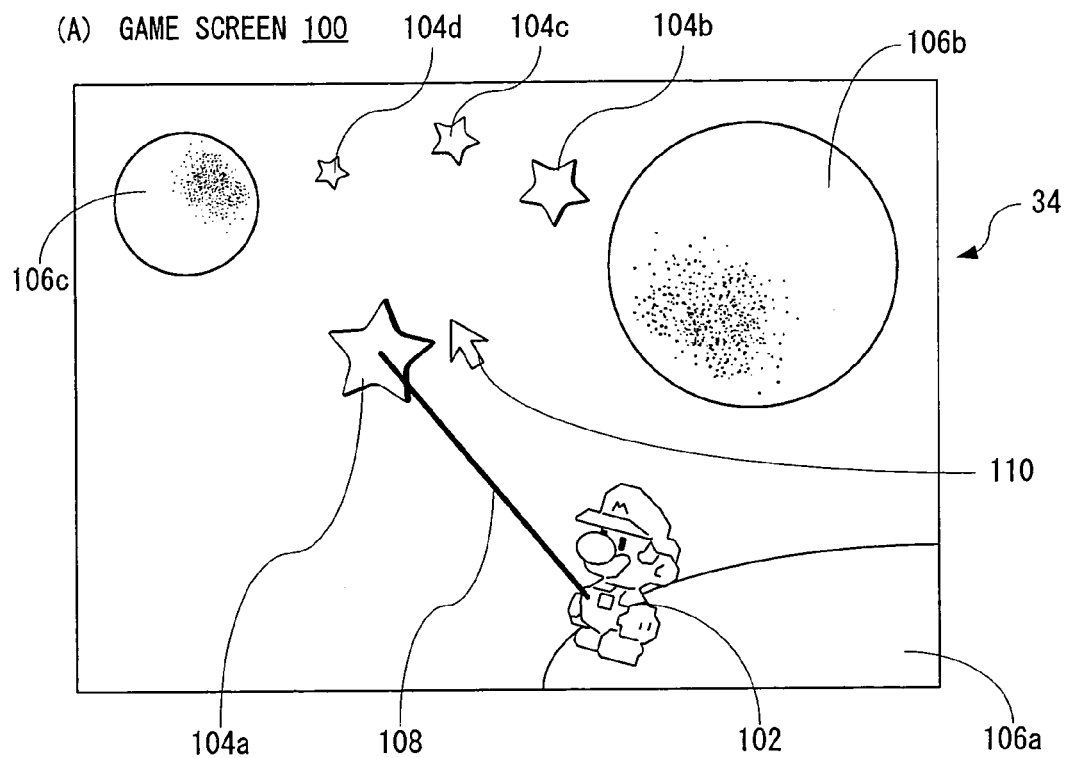
FIG. 10 is an illustrative view showing another example of the game screen displayed on the monitor as shown in FIG. 1.
Figure 10:
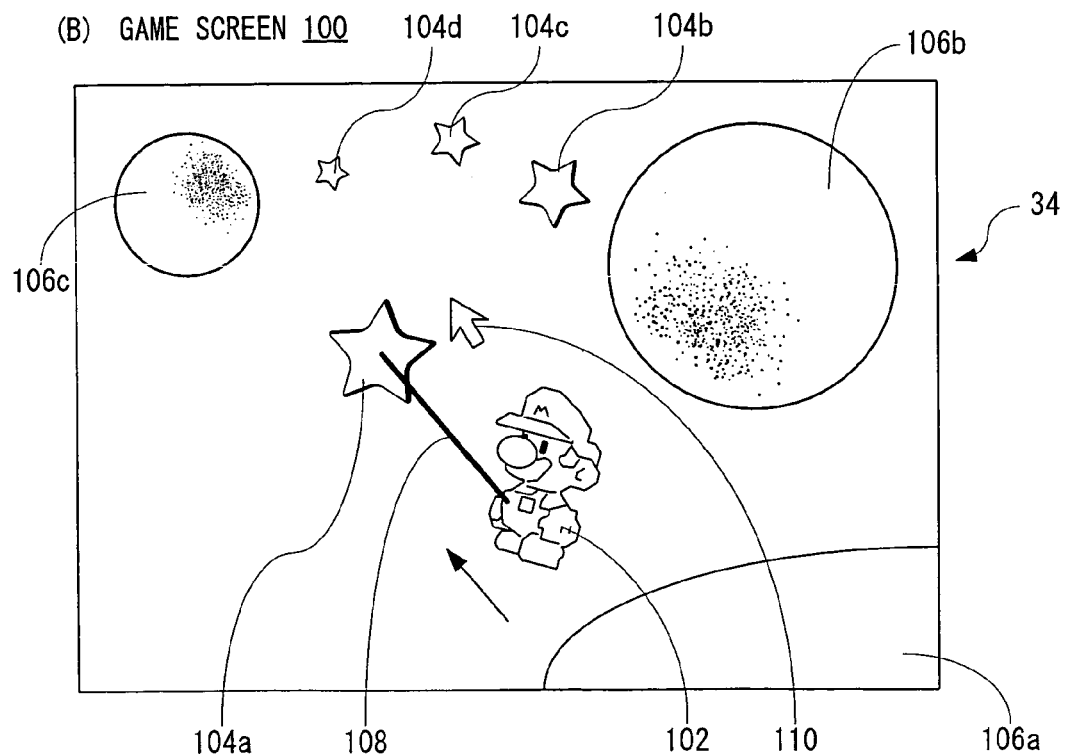
Figure 11:
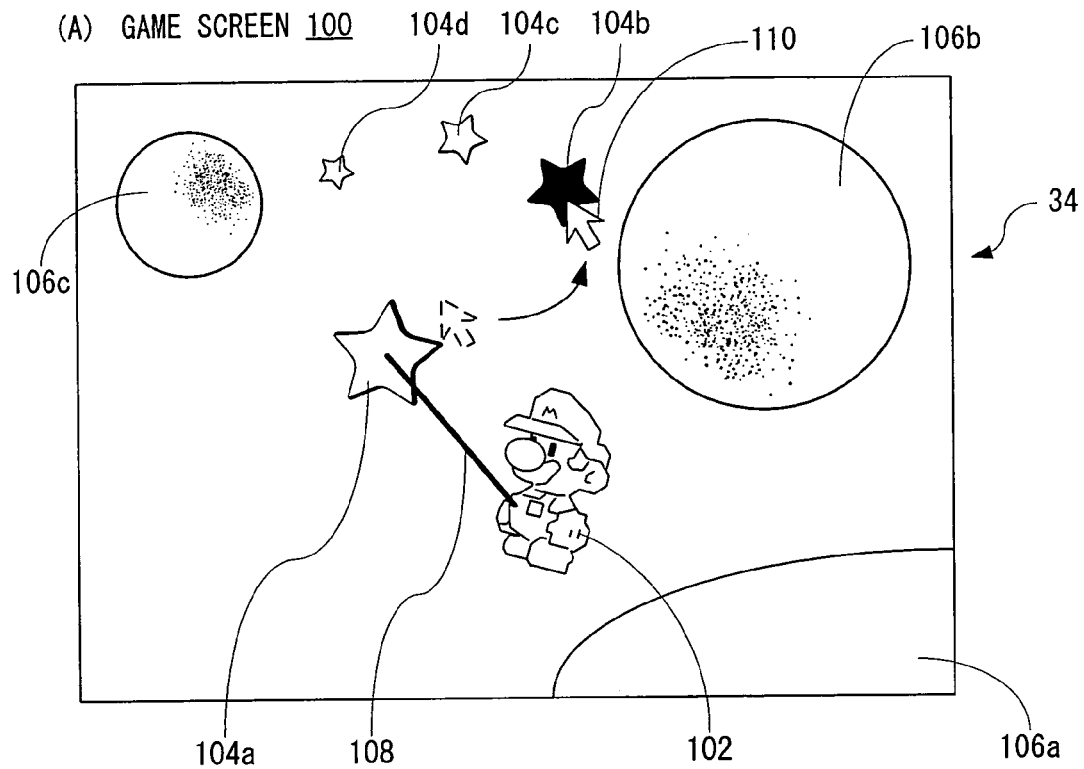
FIG. 11 is an illustrative view showing still another example of the game screen displayed on the monitor as shown in FIG. 1.
Figure 11:
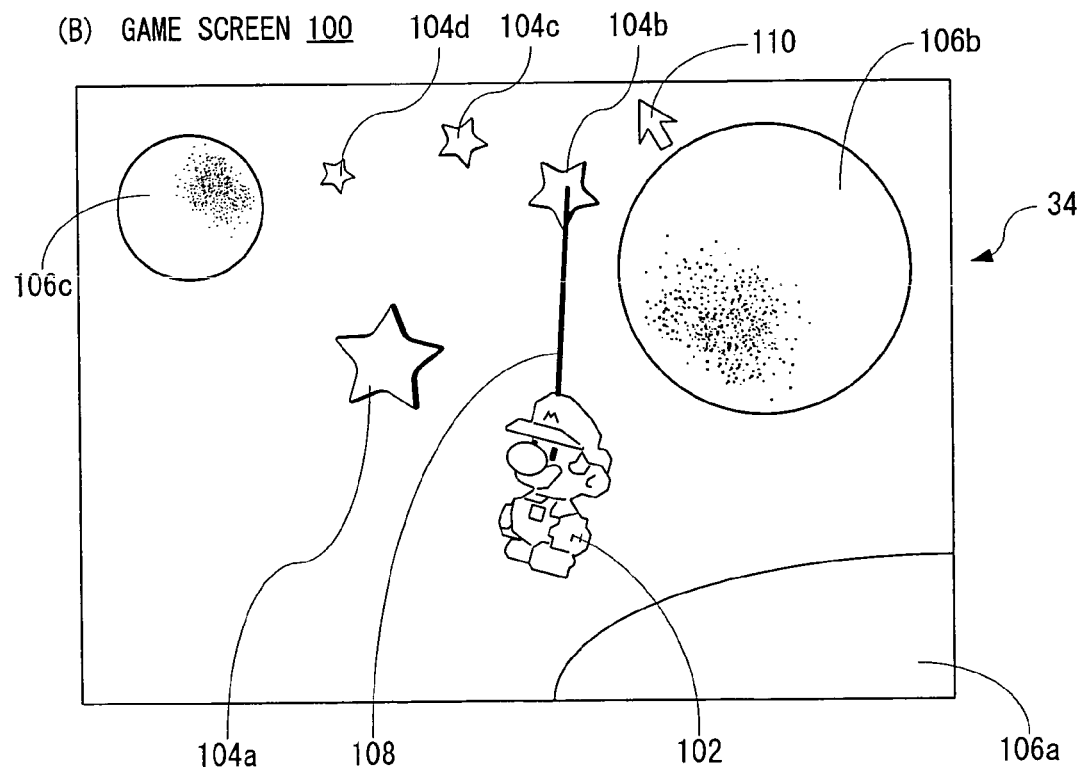

Next, an explanation will be given to the game screen of a virtual game played by using the game system 10 having the above-described constitution and the game operation of the player in the virtual game. FIG. 9 to FIG. 11 show examples of a game screen 100 displayed on the monitor 34.

As shown in FIG. 9 (A) and FIG. 9 (B), a player object 102, star objects 104 (104*a*, 104*b*, 104*c*, 104*d*) and planet objects 106 (106*a*, 106*b*, 106*c*) are displayed on the game screen 100, and a cursor image 110 is displayed in the indicated coordinates of the controller 22.

Hereunder, in this specification, the star objects 104*a* to 104*d* are collectively called a star object 104, and the planet objects 106*a* to 106*c* are collectively called a planet object 106 as needed.

The player can move the player object 102 by connecting the player object 102 and the star object 104, thereby allowing the player object 102 to approach the star object 104 (drawing the player object 102 on the star object 104), or changing the star object 104 to be connected. In FIG. 9 (A), the player object 102 exists on the planet object 106*a*. Here, the player moves (swings) the controller 22, thereby moving the cursor image 110, to allow the cursor image 110 to come in contact with a desired star object 104*a* or overlap thereon, to select this star object 104*a*. At this time, the player only indicates the display position of the desired star object 104*a* on the game screen 100 by the controller 22, and the input means 26 of the controller 22 is absolutely not operated. Then, the star object 104*a* selected (indicated) is determined as a candidate object capable of being connected to the player object 102. Then, as shown in FIG. 9 (B), a display of the star object 104*a* as the candidate object is changed so as to be visibly identified by the player. As is clarified from FIG. 9 (B), although the candidate object is shown by being painted out with black color, actually, it is shown by performing color inversion, color emphasis, and changing the image. The same thing can be said hereunder.

Although not shown, when other object exists between the player object 102 and the star object 104 indicated by the player, this star object 104 is not determined as the candidate object.

In this embodiment, when the candidate object is determined, as long as this candidate object is not determined as an object is connected to the player object 102 (target object), the state as the candidate object is continued for a fixed period of time (such as 300 frames). After a fixed period of time elapses, the sate (setting) as the candidate object is canceled. In this way, by continuing the state as the candidate object for a fixed period of time, a time margin until performing the operation of determining a certain star object as the target object is ensured for the player. A certain star object 104 is determined as the candidate object only for a fixed period of time, so as to cancel the selection and select other star object 104 as the candidate object when an undesired star object 104 is selected as the candidate object.

As shown in FIG. 9 (B), by operating a predetermined button (in this embodiment, B-trigger switch 26*i*) by the player when the candidate object is determined, this candidate object is determined (settled) as the star object 104 (called "target object" hereunder) to be connected to the player object 102. Namely, under a state that the candidate object is selected, the candidate object can be settled as the target object, regardless of the pointing position of the controller 22. Accordingly, for example, when the B-trigger switch 26*i* of the controller 22 is on, and shaking of the controller 22 occurs to deviate the pointing position of the controller 22 from the display position of the candidate object (effective range coordinates), the target object can be settled if the input data can be transmitted to the video game apparatus 12. Whereby, the operation of a predetermined button for settling the candidate object as the target object can be surely performed, and operability can be improved.

Then, as shown in FIG. 10 (A), the player object 102 and the target object (here, star object 104*a*) are connected to each other by a line object 108. In this state, when the player continues to press a predetermined button (in this embodiment, B-trigger switch 26*i*), an attracting force of the target object works, and the player object 102 is moved toward this target object. At this time, The line object 108 is shortened in accordance with a movement of the player object 102. Accordingly, as shown in FIG. 10 (B), the player object 102 approaches the target object.

Note that although the figure hardly reveals, when the B-trigger switch 26*i* is released, the attracting force of the target object does not work, and the player object 102 is accordingly stopped.

Also, although a detailed explanation is omitted, in this embodiment, when the distance in a three-dimensional game space between the player object 102 and the selected candidate object is set apart beyond a predetermined distance, even when the B-trigger switch 26*i* is pressed, this candidate object is not determined as the target object. This is because if the player object 102 moves a far distance beyond a predetermined distance at once, lack of amusement in game occurs.

Here, the speed (moving speed) required for the player object 102 to move is calculated for each frame. Specifically, the moving speed is calculated according to Equation 1. However, V' is the moving speed of the next frame, S is center coordinates (two-dimensional coordinates) of the target object, M is current (current frame) positional coordinates (two-dimensional coordinates) of the player object 102, V is the moving speed of the current frame of the player object 102, a is the attracting force of the target object, and r (0<r<1) is a damping factor of a moving speed V' of the current frame.

$$V' = [V + \{(S-M)/|S-M|\} \times a] \times r \qquad \text{[Equation 1]}$$

Note that { } shows a normalization of vector.

In addition, as the player object 102 approaches the target object, the player object 102 is easily decelerated, and therefore an attracting force a and a damping factor r are calculated (updated) for each frame according to the Equation 2. However, d is the distance (two-dimensional distance) between the player object 102 and the target object, k is a threshold value for determining whether or not the attracting force a and the damping factor r are updated (calculated), b is a basic attracting force, c (c>b) is the attracting force when satisfying distance d=0, g (0≦g≦1) is a basic damping factor, h (0≦h≦1, g<h) is the damping factor when satisfying d=0. Also, k, b, c, g, and h are fixed numbers.

When satisfying d<k, $$a = b \times t + c \times (1-t)$$

$$f = g \times t + h \times (1-t)$$

$$t = d/k \qquad \text{[Equation 2]}$$

when satisfying d>k, $$a = b$$

$$f = g$$

Further, as shown in FIG. 11 (A), when the player object 102 and the target object are connected by the line object 108 also, the player can move the controller 22, thereby moving the cursor image 110, to select other star object 104 (here, 104b, 104c, and 104d) as the candidate object.

Although not shown, when the player object 102 and the target object are connected by the line object 108, the player can select the candidate object by moving the cursor image 110 by the controller 22, regardless of whether or not the player object 102 is moved.

As shown in FIG. 11 (A), when the player executes a predetermined operation in a state that the star object 104b is selected as the candidate object, the star object 104b is determined (settled) as the target object. Namely, the target object is changed to the star object 104b from the star object 104a. Accordingly, the player object 102 and the star object 104b are connected by the line object 108.

Here, the aforementioned predetermined operation will be explained. In the game screen 100 as shown in FIG. 10 (A), when the player continues to press the B-trigger switch 26i and makes the player object 102 approach the star object 104a, the predetermined operation means the operation of releasing the B-trigger switch 26i once and pressing it again. Namely, in this case, the player turns on the B-trigger switch 26i after turning it off. However, in the game screen 100 as shown in FIG. 10 (A), when the B-trigger switch 26i is released and the player object 102 is stopped, the predetermined operation means the operation of pressing the B-trigger switch 26i. Namely, in this case, the player only turns on the B-trigger switch 26i.

Note that as described above, the target object can be settled under a state that the candidate object is selected, regardless of the pointing position of the controller 22.

In this way, the player allows the player object 102 to move in the game space, by changing the candidate object and the target object, or making the player object 102 approach the target object. For example, the player object 102 is moved from a planet object 106a to a planet object 106b, or to planet object 106c.

Figure 12:
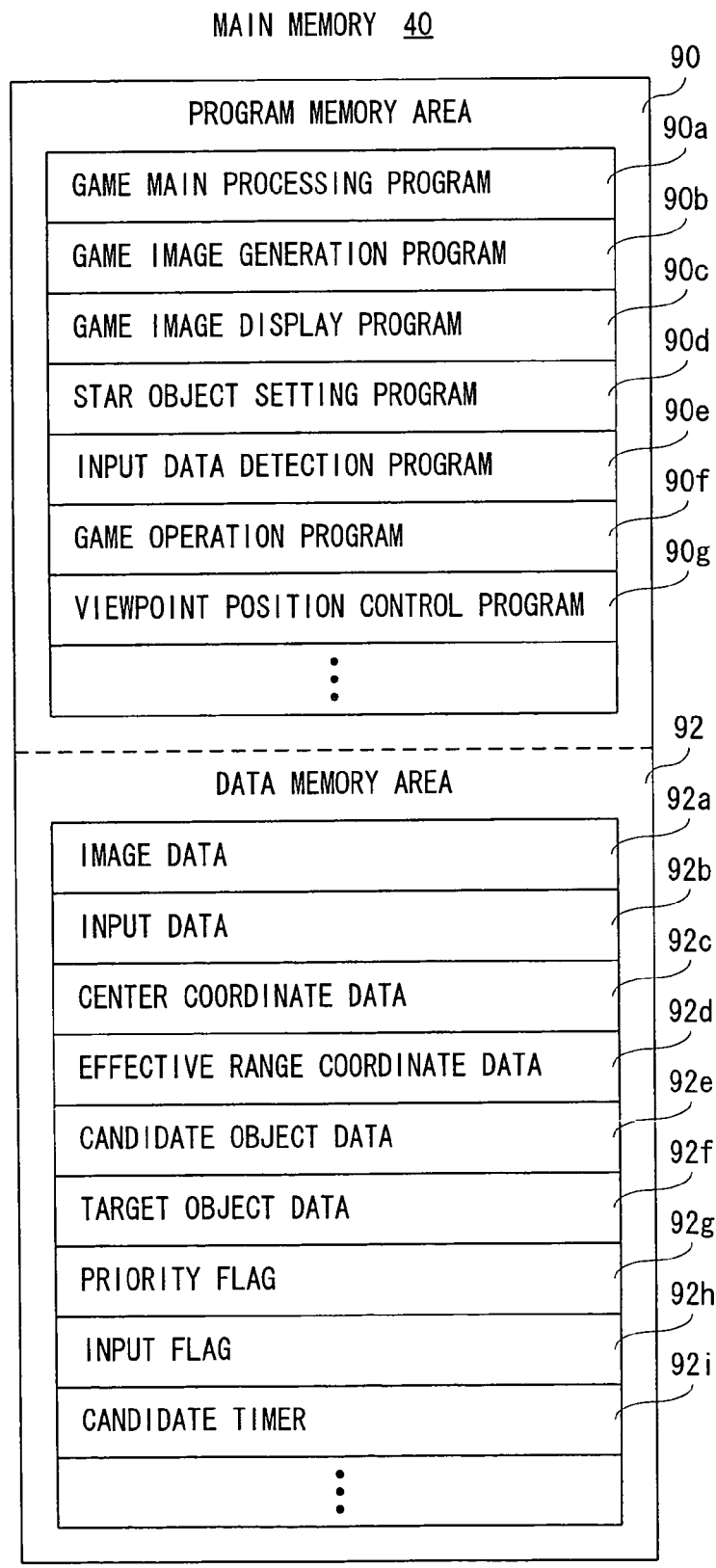
FIG. 12 is an illustrative view showing an example of a memory map of a main memory as shown in FIG. 2.

FIG. 12 is a memory map of a main memory 40 as shown in FIG. 2. As shown in FIG. 12, the main memory 40 includes a program memory area 90 and a data memory area 92. The program memory area 90 stores a game program, and this game program is composed of a game main processing program 90a, a game image generation program 90b, a game image display program 90c, a star object setting program 90d, an input data detecting program 90e, a game operation program 90f, and a viewpoint position control program 90g, etc.

The game main processing program 90a is the program for processing a main routine of the virtual game. The game image generation program 90b is the program for generating the game image including in the game space of the virtual game moving image objects such as the player object 102 and an enemy object (not shown), or background objects such as star objects 104, planet objects 106, line object 108, or the cursor image 110. The game image display program 90c is the program for outputting the game image generated by the game image generation program 90b, and displaying the game screen in the monitor 34.

The star object setting program 90d is the program for perspectively projecting the star object 104 arranged in the three-dimensional game space onto a two-dimensional virtual screen so as to be displayed on the game screen, and storing (setting) in the data memory area 92 center coordinate data 92c on the center coordinates of the star object 104 converted into two-dimensional coordinates by perspectively projecting and effective range coordinate data 92d on the coordinates in the effective range.

However, the effective range is the range for determining whether or not the indicated coordinates of the controller 22 indicates the star object 104. For example, when the effective range is set in the same size (same shape) as that of the star object 104, all coordinate data included in the display area of the star object 104 are stored. However, the effective range can be set as a simple figure (circle and rectangle) surrounding the star object 104. In this case, it is not necessary to store all the coordinate data included in this figure. For example, when the effective range is set by the circle, the data of the center coordinates of this circle and the data of radius are stored. Also, when the effective range is set by the rectangle (square and oblong), the data of apex coordinates of this rectangle is stored.

In addition, the star object setting program 90d determines whether or not other object exists between the player object 102 and the star object 104 in the game space converted into two-dimensional coordinates (or three-dimensional game space). Then, when other object exists between the player object 102 and the star object 104, the star object setting program 90d so sets that this star object 104 can not be selected as the candidate object. Meanwhile, when other object does not exist between the player object 102 and this star object 104, the star object setting program 90d so sets that this star object 104 can be selected as the candidate object. Specifically, a priority flag 92g for the star object 104 is established (turned on) or not-established (turned off).

However, instead of the player object 102, whether or not other object exists between a viewpoint (virtual camera) and the star object 104 may be determined.

The input data detection program 90e is the program for detecting the input data from the controller 22 for each predetermined time period (one frame). Specifically, the input data detection program 90e reads the input data temporarily stored in a buffer (not shown) of a controller I/F 56 for each one frame, and stores the read input data in the data storage region 92. However, when the input data is not temporarily stored in the buffer of the controller I/F 56, the input data detection program 90e stores nothing in the data memory area 92.

The game operation program 90f is the program for moving the player object 102 in the game space according to the operation of the player, and in the coursed of the process, the star object 104 selected by the player is determined as the candidate object, and the star object 104 being the candidate object is determined as the target object. The viewpoint position control program 90g is the program for setting (updating) the three-dimensional position of the viewpoint (virtual camera) set in the game space, according to the movement of the player object 102. In addition, the viewpoint position control program 90g sometimes controls not only the three-dimensional position of the viewpoint but also the direction of the viewpoint.

Note that although not shown, the program memory area 90 stores an audio output program and a backup program, and so forth. The audio output program is the program for outputting a sound required for the game such as game sound (BGM) voice or imitative sound of the object, and a sound effect. Also, the backup program is the program for saving the game data in the memory card 30.

The data memory area 92 stores the image data 92a, input data 92b, center coordinate data 92c, effective range coordinate data 92d, candidate object data 92e, target object data 92f, priority flag 92g, and input flag 92h, etc, and is provided with a candidate timer 92i.

The image data 92a is the data for generating the aforementioned game image (such as polygon and texture). As described above, the input data 92b is the data including at least one of the operation data, acceleration data, and marker coordinate data, and is updated according to the input data detection program 90e.

The center coordinate data 92c is the data on the center coordinates of the star object 104 (such as 104a to 104d) set according to the star object setting program 90d, and is stored corresponding to each star object 104. In addition, the effective range coordinate data 92c is the data on all of the coordinates included in the effective range of the star object 104 (104a to 104d) set according to the star object setting program 90e, and is stored corresponding to each star object 104.

The candidate object data 92e is the data on identification information of the star object 104 indicated by the controller 22, and is stored and deleted according to the game operation program 90f. However, the game operation program 90f does not delete this candidate object data 92e until a fixed time period elapses or the target object is determined, after the candidate object data 92e is stored once.

When the candidate object is determined, the target object data 92f is the data on the identification information of the star object 104 determined to be the target object by turning on the B-trigger switch 26i of the controller 22, and is stored (updated) according to the game operation program 90f.

The priority flag 92g is the flag for determining whether or not other object exists between the player object 102 and the star object 104. In other words, the priority flag 92g is the flag for determining whether or not the star object 104 is prioritized. Accordingly, the priority flag 92g is provided for each star object 104. However, strictly speaking, the priority flag 92g is corresponded to the two-dimensional coordinates (effective range coordinate data 92d) of each star object 104. At this time, the priority flag 92g may be set corresponding to each of a plurality of effective range coordinates set in each star object 104. In this state, for example, when other object exists between the player object 102 and a part of the star objects 104, setting of the priority flag 92g can be changed between a part of the star object 104 and other part. Accordingly, the following processing can be realized. Namely, when a part of the star objects 104 is indicated by the controller 22, this star object 104 can not be selected, but when other part is indicated, this star object 104 can be selected.

Note that in order to easily determine the star object 104 corresponding to the indicated coordinates of the controller 22, the two-dimensional coordinates of the star object 104 are corresponded.

In addition, each priority flag 92g is constituted of a register of one bit, and its data value is set (updated) in accordance with the star object setting program 90d. When other object exits between the player object 102 and the star object 104, the priority flag 92g corresponding to this star object 104 is off, and the data value "0" is set in the bit of the register. Meanwhile, when other object does not exist between the player object 102 and the star object 104, the priority flag 92g corresponding to this star object 104 is on so as to prioritize this star object 104, and the data value "1" is set in the bit of the register.

The input flag 92h is the flag for determining whether or not the predetermined input means 26 (in this embodiment, the B-trigger switch 26i) is pressed. This input flag 92h is constituted of the register of one bit, for example, and its data value is set (updated) according to the game operation program 90f. When the B-trigger switch 26i is pressed, namely, when the operation data shows that the B-trigger switch 26i is turned on, the input flag 92h is on, and the data value "1" is set in the bit of the register. Meanwhile, when the B-trigger switch 26i is not pressed, namely, when the operation data shows that the B-trigger switch 26i is turned off, the input flag 92h is off, and the data value "0" is set in the bit of the register.

A candidate timer 92i is the timer for counting a fixed period of time during that the candidate object is determined. For example, when the candidate object is determined, namely, when the candidate object data 92e is stored in the data memory area 92, a fixed period of time (such as 300 frames) is set in the candidate timer 92i. Then, as long as the candidate object is not determined as the target object, the candidate timer 92i is counted down for each one frame. Then, when the candidate timer 92i indicates that time is up, the candidate object data 92e is deleted.

Although not shown, the data memory area 92 also stores the game data and sound data or other flag, etc.

Figure 13:
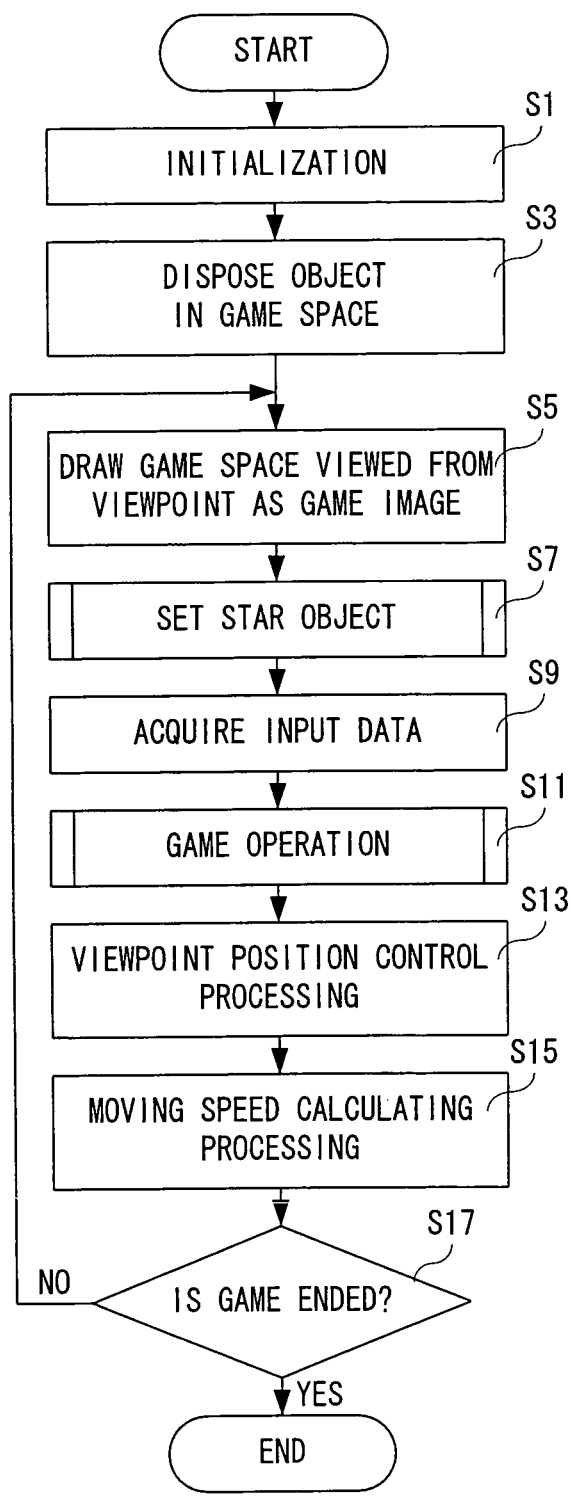
FIG. 13 is a flowchart showing a game entire processing of a CPU as shown in FIG. 2.

Specifically, the CPU 36 as shown in FIG. 2 executes game entire processing shown in FIG. 13. As shown in FIG. 3, when the game entire processing is executed, the CPU 36 executes initialization in a step S1. Here, a buffer area of the main memory 40 is cleared and each kind of flag is off. In a next step S3, the object is disposed within the game space. Namely, the objects such as player object 102, star object 104, and planet object 106 are generated.

Subsequently, in a step S5, the game space viewed from the viewpoint is drawn as the game image. Namely, the game space is photographed by the virtual camera, and the image thus photographed is converted into two-dimensional camera coordinates, with the virtual camera set as an origin. In other words, the game space viewed from the viewpoint is perspectively projected on a virtual screen. Next, in a step S7, setting processing (FIG. 14) of the star object as will be described later is executed, and in a step S9, the input data 92b is acquired (detected).

When the input data is acquired, in a step S11, the game operation processing as will be described later (FIG. 15 to FIG. 18) is executed, and in a step S13, viewpoint position control processing is executed. Next, in a step S15, according to Equation 1 and Equation 2, moving speed calculation processing is executed. Then, in a step S117, whether or not the game is ended is determined. Namely, whether or not a game end is indicated by the player, or whether or not the game is over is determined. If "NO" in the step S17, namely, when the game is not ended, the processing is returned to the step S5 as it is. Meanwhile, if "YES" in the step S17, namely, when the game is ended, the game entire processing is ended as it is.

Figure 14:
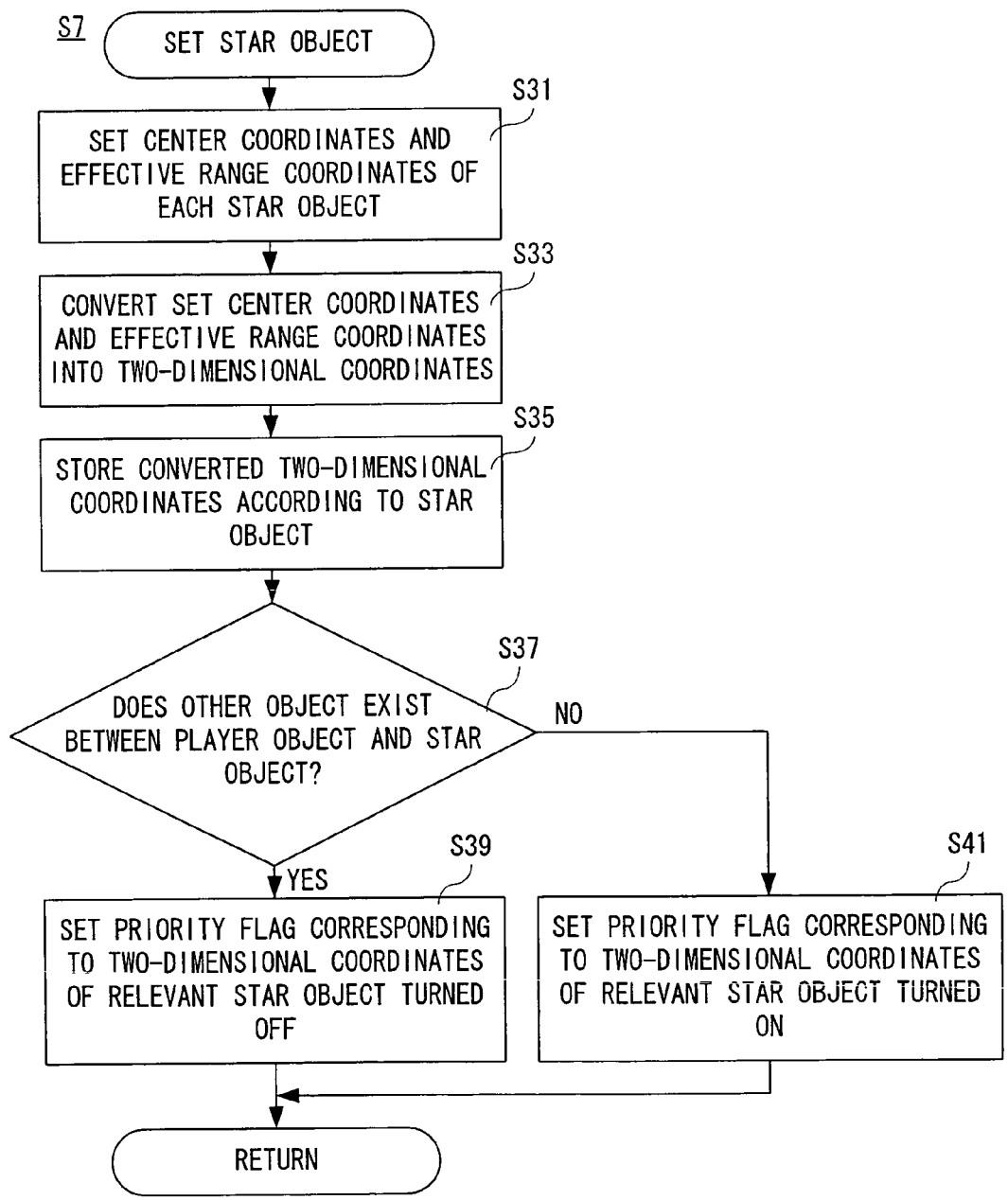
FIG. 14 is a flowchart showing a setting processing of a star object of the CPU as shown in FIG. 2.

FIG. 14 is a flowchart showing the setting processing of the star object in the step S7 shown in FIG. 13. As shown in FIG. 13, when the setting processing of the star object is started, the CPU 36 sets the center coordinates and effective range coordinates of each star object 104 (104a to 104d) in a step S31. However, the coordinates of the center coordinates and the coordinates of the effective range set in this step S31 are three-dimensional coordinates. Accordingly, when the effective range is set by the aforementioned circle and rectangle, the three-dimensional effective range is set as a spherical body, a cubic body, and a rectangular prismatic body surrounding the star object 104.

In a next step S33, the center coordinates and the effective range coordinates set in the step S31 are converted into two-dimensional coordinates. Namely, the center coordinates and the effective range coordinates are converted into the two-dimensional coordinates for perspectively projecting them on the virtual screen. Subsequently, in a step S35, the two-dimensional coordinates thus converted are stored corresponding to the star object 104. Namely, the center coordinate data 92c and the effective range coordinate data 92d on the star object 104 are stored in the data memory area 92 of the main memory 40.

Subsequently, in a step S37, it is determined whether or not other object exists between the player object 102 and the star object 104. If "YES" in the step S37, namely, when other object exists between the player object 102 and the star object 104, the priority flag 92g corresponding to the two-dimensional coordinates (effective range coordinate data 92d) of this star object 104 is off in a step S39, and the processing is returned to the game entire processing as shown in FIG. 13. Meanwhile, if "NO" in the step S37, namely, when other object does not exist between the player object 102 and the star object 104, the priority flag 92g corresponding to the two-dimensional coordinates (effective range coordinate data 92d) of this star object 104 is on in a step S41, and the processing is returned to the game entire processing.

Figure 15:
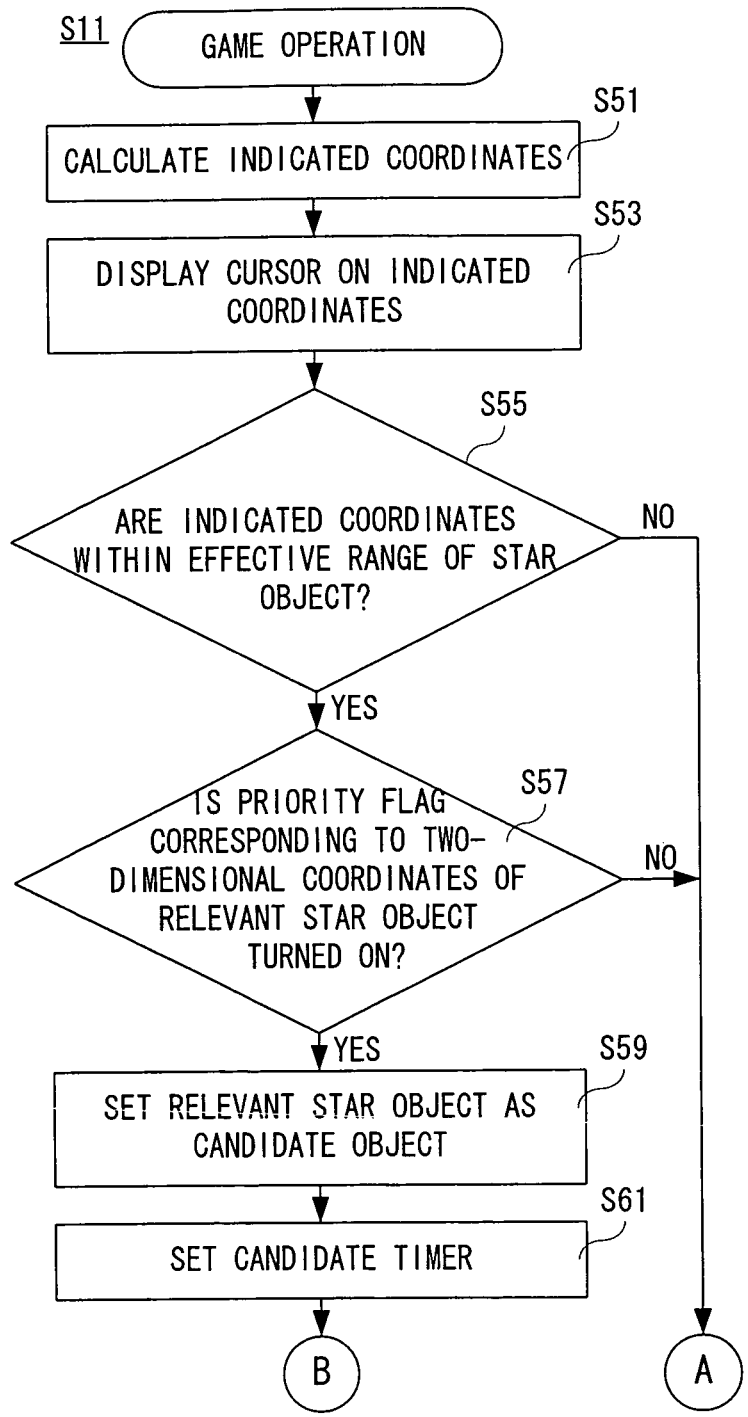
FIG. 15 is a flowchart showing a part of a game operation processing of the CPU as shown in FIG. 2.

FIG. 15 to FIG. 18 are flowcharts showing the game operation processing in the step S11 shown in FIG. 13. As shown in FIG. 15, when the game operation processing is started, the CPU 36 calculates the indicated coordinates in a step S51. Here, the CPU 36 detects the marker coordinate data included in the input data 92b, and base on this marker coordinate data, calculates the indicated coordinates of the controller 22. In a subsequent step S53, the cursor image 110 is displayed on the indicated coordinates of the controller 22.

Subsequently, in a step S55, it is determined whether or not the indicated coordinates are within the effective range of the star object 104. Namely, it is determined whether or not the indicated coordinates are included in the coordinates shown by the effective range coordinate data 92d. However, as described above, since the star object 104 is indicated in the cursor image 110, whether or not the cursor image 110 comes in contact with the star object 104 or overlaps thereon may be determined. If "NO" in the step S55, namely, when the indicated coordinates are outside of the effective range of the star object 104, the processing is advanced to a step S63 shown in FIG. 16. Meanwhile, if "YES" in the step S55, namely, when the indicated coordinates are within the effective range of the star object 104, it is determined whether or not the priority flag 92g corresponding to the two-dimensional coordinates (effective range coordinates) of this star object 104 is turned on in a step S57.

Figure 17:
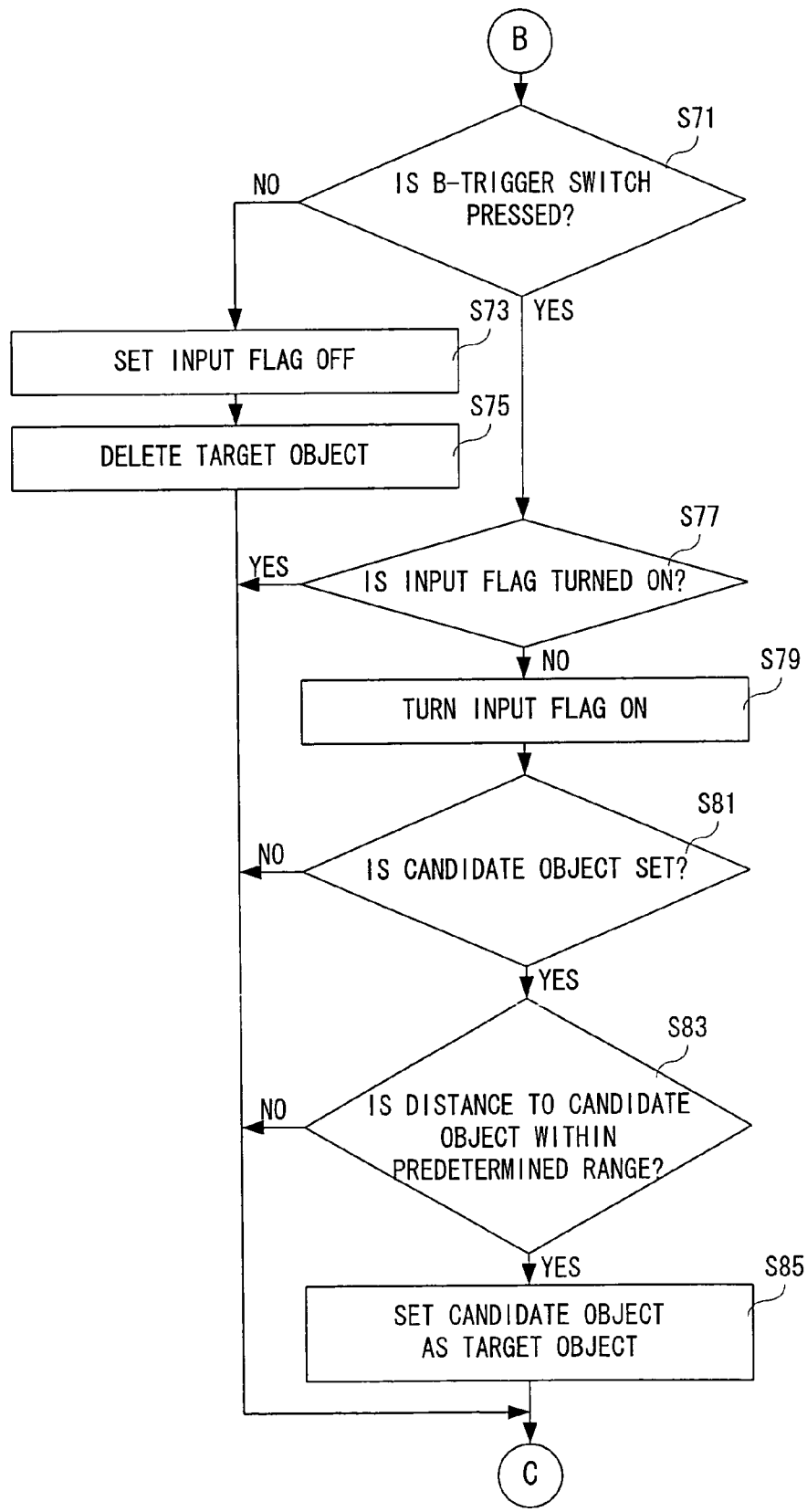
FIG. 17 is a flowchart of still another part of the game operation processing of the CPU as shown in FIG. 2, following FIG. 15 and FIG. 16.

If "NO" in the step S57, namely, when the priority flag 92g corresponding to the two-dimensional coordinates of this star object 104 is turned off, it is so determined that this star object 104 can not be set (determined) as the candidate object, and the processing is advanced to the step S63 as it is. Meanwhile, if "YES" in the step S57, namely, when the priority flag 92g corresponding to the two-dimensional coordinates of this star object 104 is on, this star object 104 is set (determined) as the candidate object in a step S59. Namely, the data of the identification information of this star object 104 is stored in the data memory area 92 as the candidate object data 92e. At this time, when the data of the identification information of other star object 104 is stored in the data memory area 92 as the candidate object data 92e, the content of the candidate object data 92e may be rewritten into the data of the identification information of the star object 104 indicated this time, or may not be rewritten. When it is not rewritten, the star object 104 indicated after the candidate object is deleted in a step S69 as will be described later is made to be freely set (written). Then, in a step S61, by setting the candidate timer 92i, the processing is advanced to a step S71 as shown in FIG. 17. For example, in the step S61, a fixed period of time (300 frames) is set in the candidate timer 92i.

Figure 16:
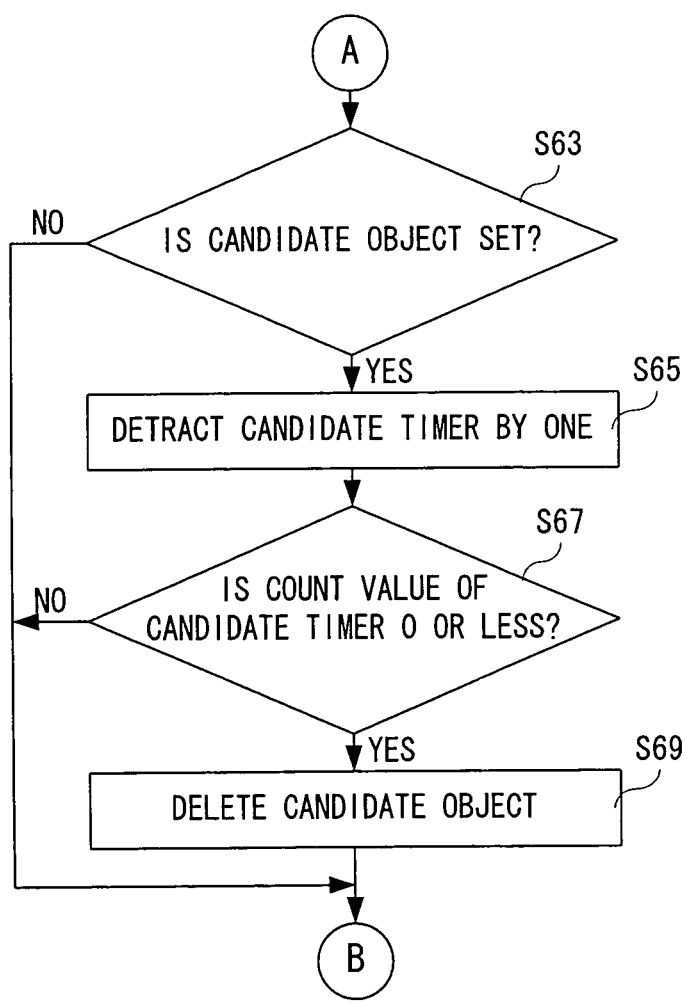
FIG. 16 is a flowchart of another part of the game operation processing of the CPU as shown in FIG. 2, following FIG. 15.

As described above, if "NO" in the step S55 or the step S57, and as shown in FIG. 16, when the processing is advanced to the step S63, it is determined whether or not the candidate object is set. Here, it is determined whether or not the candidate object data 92e is stored in the data memory area 92. If "NO" in the step S63, namely, when the candidate object is not set, the processing is advanced to the step S71 as it is. Meanwhile, if "YES" in the step S63, namely, when the candidate object is set, the candidate timer 92i is decremented by one (frame) in a step S65.

In a subsequent step S67, it is determined whether or not a count value of the candidate timer 92i is 0 or less. Namely, it is determined whether or not a fixed period of time elapses. If "NO" in the step S67, namely, when the fixed period of time does not elapse, the processing is advanced to the step S71 as it is, so as to maintain a setting state of the candidate object. Meanwhile, if "YES" in the step S67, namely, when the fixed period of time elapses, the candidate object, namely, the candidate object data 92e is deleted from the data memory area 92 in the step S69, and the processing is advanced to the step S71.

Figure 18:
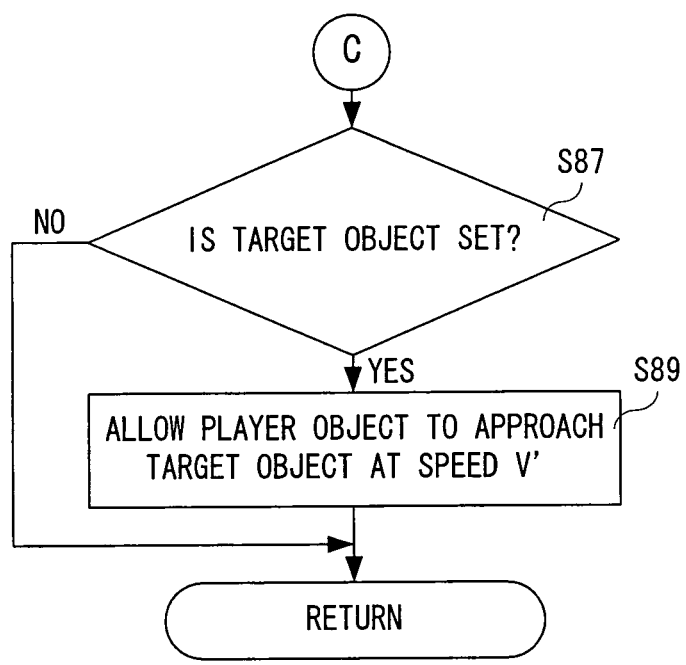
FIG. 18 is a flowchart of still another part of the game operation processing of the CPU as shown in FIG. 2, following FIG. 17.

As shown in FIG. 17, in the step S71, it is determined whether or not the B-trigger switch 26i is pressed. Namely, it is determined whether or not the operation data included in the input data 92b detected in the step S9 of the game entire processing shows that the B-trigger switch 26i is turned on. If "NO" in the step S71, namely, when the B-trigger switch 26i is not pressed, the input flag 92h is off in a step S73, and the target object, namely, the target object data 92f is deleted from the data memory area 92 in a step S75, and the processing is advanced to a step S87 as shown in FIG. 18. However, when the target object is already deleted, the processing in the step S75 is not executed.

However, in the step S71, if "YES", namely, when the B-trigger switch 26i is pressed, it is determined whether or not the input flag 92h is turned on in a step S77. Namely, it is determined whether or not the B-trigger switch 26i is kept pressed. If "YES" in the step S77, namely, when the input flag 92h is turned on, it is so determined that the B-trigger switch 26i is kept pressed, and the processing is advanced to the step S87. Meanwhile, if "NO" in the step S77, namely, when the input flag 92h is turned off, it is so determined that the B-trigger switch 26i is on this time, and the input flag 92h is turned on in a step S79.

Subsequently, in a step S81, it is determined whether or not the candidate object is set. If "NO" in the step S81, namely, when the candidate object is not set, the processing is advanced to the step S87 as it is. Meanwhile, if "YES" in the step S81, namely, when the candidate object is set, it is determined whether or not the distance between the player object 102 and the candidate object is within a predetermined distance in a step S83.

If "NO" in the step S83, namely, when the distance between the player object 102 and the candidate object exceeds the predetermined distance, the processing is advanced to the step S87 as it is. Meanwhile, if "YES" in the step S83, namely, when the distance between the player object 102 and the candidate object is within the predetermined distance, the star object 104 of the candidate object is set (determined) as the target object in a step S85, and the processing is advanced to the step S87. For example, in the step S85, after the candidate object data 92e is copied as the target object data 92f, this candidate object data 92e is deleted.

As shown in FIG. 18, in the step S87, it is determined whether or not the target object is set. Namely, it is determined whether or not the target object data 92f is stored in the data memory area 92. If "NO" in the step S87, namely, when the target object is not set, the processing is returned to the game entire processing shown in FIG. 13 as it is. Meanwhile, if "YES" in the step S87, namely, when the target object is set, in a step S89, the player object 102 is moved to approach the target object at a speed V' of the previous frame calculated in the step S15 of the game entire processing, and the processing is returned to the game entire processing. Namely, in the step S89, positional coordinates of the player object 102 are updated in accordance with Equation 3. However, M' is the positional coordinate of the player object 102.

$$M'=M+V' \quad \text{[Equation 3]}$$

According to this embodiment, the target object is determined by using the controller and the player object is moved to approach the determined target object. Therefore, the player object is allowed to perform the processing in accordance with the target object. Accordingly, the amusement in the game by using the pointing device can be increased.

Note that in this embodiment, when the B-trigger switch is pressed, the target object is determined, and with the target object determined, when the B-trigger switch is kept pressed, the player object is moved to approach the target object. However, other button or switch may be used as the input means, and a different button or switch may be used between cases when the target object is determined and when the player object is moved.

Also, when the B-trigger switch is kept pressed, the player object is moved to approach the target object. However, it is not necessary to keep the B-trigger switch pressed. For example, when the B-trigger switch is pressed, the player object may start to move, and when the B-trigger switch is pressed next, the player object may stop moving.

Further, according to this embodiment, whichever star object is determined as the target object, this target object is connected to the player object by the line object, and the player object is allowed to approach this target object. However, the embodiment is not limited thereto. For example, in accordance with the star object determined as the target object, different processing may be performed. For example, when a certain star object is determined as the target object, by keeping the B-trigger switch pressed, the player object may be moved to set apart from this target object. Also, when other star object is determined as the target object, by keeping the trigger switch pressed, the player object may be rotated around this target object.

Further, according to another embodiment, by determining the target object, a capability (parameter) of the player object may be changed. For example, a capability object (such as an icon) showing the capability of the player object (invincibility, attack capability, increase of moving speed) is displayed on the game screen, and when a certain capability object is determined to be the target object, the B-trigger switch is kept pressed. Whereby, the target object may be invincible, the attack capability may be enhanced, and the moving speed may be increased all that time.

Further, according to still another embodiment, a plurality of enemy objects are displayed on the game screen as target objects, and when a certain enemy object is determined to be the target object, the B-trigger switch is kept pressed. Whereby, the player object may attack a target enemy object all that time.

According to this embodiment, after the candidate object is determined, the state as the candidate object is made to continue for a fixed period of time. However, the embodiment is not limited thereto. For example, only when the pointing position of the controller is deviated from the effective range coordinates of the candidate object for a fixed period of time, the state as the candidate object may be continued. Also, only when the pointing position of the controller is within a predetermined distance form the center position of the candidate object, the state as the candidate object may be continued.

Further, according to this embodiment, based on a marker image, the indicated coordinates of the controller are calculated. Therefore, an acceleration sensor is not required to be provided in the controller. However, based on a change of acceleration data inputted from the controller, by calculating a moving (swinging) direction of the controller and a moving distance, the indicated coordinates of the controller can be calculated. Calculation of the indication image by acceleration as described above may be complementarily performed when the marker image can not be accurately detected.

Further according to this embodiment, the marker is provided in the circumference of the monitor 34, and an imager is provided in the controller to photograph the image of infrared light outputted from the marker, so as to detect the pointing position of the controller. However, the embodiment is not limited thereto. For example, the marker may be provided in the controller, and the imager may be provided in the circumference of the monitor 34. In addition, instead of the imager, a light reception sensor, etc, may be used.

In addition, according to this embodiment, the controller having the structure shown in the embodiment is used as the pointing device. However, instead of the controller, a computer mouse can be used.

Although example embodiments of the present invention have been described and illustrated in detail, it is clearly understood that the same is by way of illustration and example only and is not to be taken by way of limitation, the spirit and scope of the present invention being limited only by the terms of the appended claims.

What is claimed is:

1. A non-transitory storage medium storing a game program executed by a game apparatus having a display to provide a method whereby input data is received from a pointing device including at least one input device, the method comprising:
    displaying on a screen of the display at least one non-player object and a player object simultaneously;
    detecting a position on the screen pointed by said pointing device;
    determining whether or not one non-player object is designated, based on a detected pointing position;
    determining whether or not a predetermined input device is operated in a state that said determining of whether or not one non-player object is designated so determines that said non-player object is designated; and
    controlling said player object to perform processing related to said non-player object being designated by said pointing device, when said determining of whether or not the predetermined input device is operated in a state so determines that said predetermined input device is operated.

2. The non-transitory storage medium storing the game program according to claim 1, wherein
    said pointing device includes an imaging device for photographing an object to be imaged set in the circumference of a display and outside of the screen of the display, and
    said detecting the pointing position includes detecting the position on the screen pointed by said pointing device, based on a photographic result of said imaging device.

3. The non-transitory storage medium storing the game program according to claim 1, wherein
    said determining whether or not the predetermined input device is operated includes determining whether or not said predetermined input device is continuously operated, and
    said controlling said player object includes controlling said player object to perform the processing related to said non-player object, while said determining whether or not the predetermined input device is operated so determines that said predetermined input device is continuously operated.

4. The non-transitory storage medium storing the game program according to claim 1, wherein the method further comprises:
   determining a distance between said non-player object and said player object, when said determining whether or not said non-player object is designated so determines that said non-player object is designated; and
   said controlling the player object includes controlling said player object to perform the processing related to said non-player object, when said distance is within a predetermined range.

5. The non-transitory storage medium storing the game program according to claim 1, wherein
   when said determining whether or not the non-player object is designated so determines that said non-player object is designated, said game program causes said processor to determine whether or not other object exists between this non-player object and said player object, and
   said controlling the player object includes controlling said player object to perform the processing related to said non-player object, when it is determined that other object does not exist.

6. The non-transitory storage medium storing the game program according to claim 1, wherein
   said controlling the player object includes controlling a movement of said player object so that said player object approaches said non-player object.

7. The non-transitory storage medium storing the game program according to claim 6, wherein the method further comprises:
   calculating a moving speed of said player object based on said distance, and
   said controlling the player object includes controlling the movement of said player object based on a calculated moving speed.

8. The non-transitory storage medium storing the game program according to claim 1, wherein
   said displaying includes displaying a plurality of said non-player objects;
   said determining whether or not the non-player object is designated includes determining whether or not any one of said plurality of non-player objects are designated, and
   said controlling the player object includes controlling the player object to perform the processing different from each other, for each of said non-player objects that are determined to be designated.

9. A game apparatus having a display and configured to receive input data from a pointing device including at least one input device, comprising:
   an object displaying programmed logic circuitry for displaying on a screen of the display at least one non-player object and a player object simultaneously;
   a pointing position detecting programmed logic circuitry for detecting a position on the screen pointed by said pointing device;
   a non-player object designation determining programmed logic circuitry for determining whether or not one non-player object is designated, based on a pointing position detected by said pointing position detecting programmed logic circuitry;
   an operation state determining programmed logic circuitry for determining whether or not a predetermined input device is operated in a state that the designation determining programmed logic circuitry for one non-player object so determines that said one non-player object is designated; and
   a player object controlling programmed logic circuitry for controlling said player object to perform processing related to said non-player object being designated by said pointing device, when said operation state determining programmed logic circuitry so determines that said predetermined input device is operated.

10. The game apparatus according to claim 9, wherein
    said pointing device includes an imaging device for photographing an object to be imaged set in the circumference of a display and outside of the screen of the display, and
    said pointing position detecting programmed logic circuitry detects the position on the screen pointed by said pointing device, based on a photographic result of said imaging device.

11. The game apparatus according to claim 9, wherein
    said operation state determining programmed logic circuitry determines whether or not said predetermined input device is continuously operated, and
    said player object controlling programmed logic circuitry controls said player object to perform the processing related to said non-player object, while said operation state determining programmed logic circuitry so determines that said predetermined input device is continuously operated.

12. The game apparatus according to claim 9, further comprising:
    distance determining programmed logic circuitry for determining a distance between said non-player object and said player object, when said non-player object designation determining programmed logic circuitry so determines that said non-player object is designated; and
    said player object controlling programmed logic circuitry controls said player object to perform the processing related to said non-player object, when said distance is within a predetermined range.

13. The game apparatus according to claim 9, wherein
    when said non-player object designation determining programmed logic circuitry so determines that said non-player object is designated, existence determining programmed logic circuitry determines whether or not other object exists between this non-player object and said player object, and
    said player object controlling programmed logic circuitry controls said player object to perform the processing related to said non-player object, when said existence determining programmed logic circuitry so determines that other object does not exist.

14. The game apparatus according to claim 9, wherein
    said player object controlling programmed logic circuitry controls a movement of said player object so that said player object approaches said non-player object.

15. The game apparatus according to claim 14, further comprising
    speed calculating programmed logic circuitry for calculating a moving speed of said player object based on said distance, and
    said player object controlling programmed logic circuitry controls the movement of said player object based on a speed calculated by said speed calculating programmed logic circuitry.

16. The game apparatus according to claim 9, wherein
said object displaying programmed logic circuitry displays a plurality of said non-player objects;
said non-player object designation determining programmed logic circuitry further determines whether or not any one of said plurality of non-player objects are designated, and
said player object controlling programmed logic circuitry controls the player object to perform the processing different from each other, for each of said non-player objects that are determined to be designated.

17. A game control method of a game apparatus having a display whereby input data from a pointing device including at least one input device is received, comprising:
displaying on a screen of the display at least one non-player object and a player object simultaneously;
detecting a position on a screen pointed by said pointing device;
determining whether or not one non-player object is designated, based on the detected pointing position;
determining whether or not a predetermined input device is operated in a state that said determining of whether or not one non-player object is designated so determines that said non-player object is designated, and
controlling said player object to perform processing related to said non-player object being designated by said pointed device, when said determining of whether or not the predetermined input device is operated in a state so determines that said predetermined input device is operated.

18. The method according to claim 10, wherein
said pointing device includes an imaging device for photographing an object to be imaged set in the circumference of a display and outside of the screen of the display, and
said detecting the pointing position includes detecting the position on the screen pointed by said pointing device, based on a photographic result of said imaging device.

19. The method according to claim 10, wherein
said determining whether or not the predetermined input device is operated includes determining whether or not said predetermined input device is continuously operated, and
said controlling said player object includes controlling said player object to perform the processing related to said non-player object, while said determining whether or not the predetermined input device is operated so determines that said predetermined input device is continuously operated.

20. The method according to claim 10, wherein the method further comprises:
determining a distance between said non-player object and said player object, when said determining whether or not said non-player object is designated so determines that said non-player object is designated; and
said controlling the player object includes controlling said player object to perform the processing related to said non-player object, when said distance is within a predetermined range.

21. The method according to claim 10, wherein
when said determining whether or not the non-player object is designated so determines that said non-player object is designated, determining whether or not other object exists between this non-player object and said player object, and
said controlling the player object includes controlling said player object to perform the processing related to said non-player object, when it is determined that other object does not exist.

22. The method according to claim 10, wherein said controlling the player object includes controlling a movement of said player object so that said player object approaches said non-player object.

23. The method according to claim 22, wherein the method further comprises:
calculating a moving speed of said player object based on said distance, and
said controlling the player object includes controlling the movement of said player object based on a calculated moving speed.

24. The method according to claim 10, wherein
said displaying includes displaying a plurality of said non-player objects;
said determining whether or not the non-player object is designated includes determining whether or not any one of said plurality of non-player objects are designated, and
said controlling the player object includes controlling the player object to perform the processing different from each other, for each of said non-player objects that are determined to be designated.

25. A game system comprising:
a display having a screen;
a pointing device having at least one input device; and
a game apparatus having one or more processors and configured to receive input data from the pointing device, the game apparatus having:
an object displaying programmed logic circuitry for displaying on the screen of the display at least one non-player object and a player object simultaneously,
a pointing position detecting programmed logic circuitry for detecting a position on the screen pointed by said pointing device,
a non-player object designation determining programmed logic circuitry for determining whether or not one non-player object is designated, based on a pointing position detected by said pointing position detecting programmed logic circuitry,
an operation state determining programmed logic circuitry for determining whether or not a predetermined input device is operated in a state that the designation determining programmed logic circuitry for one non-player object so determines that said one non-player object is designated, and
a player object controlling programmed logic circuitry for controlling said player object to perform processing related to said non-player object being designated by said pointing device, when said operation state determining programmed logic circuitry so determines that said predetermined input device is operated.

* * * * *